US011935269B2

(12) United States Patent
Zhang et al.

(10) Patent No.: US 11,935,269 B2
(45) Date of Patent: Mar. 19, 2024

(54) POINT CLOUD ENCODING METHOD AND ENCODER

(71) Applicant: Huawei Technologies Co., Ltd., Shenzhen (CN)

(72) Inventors: Dejun Zhang, Shenzhen (CN); Kangying Cai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 17/345,523

(22) Filed: Jun. 11, 2021

(65) Prior Publication Data

US 2021/0304444 A1 Sep. 30, 2021

Related U.S. Application Data

(63) Continuation of application No. PCT/CN2019/124615, filed on Dec. 11, 2019.

(30) Foreign Application Priority Data

Dec. 13, 2018 (CN) .......................... 201811527959.5

(51) Int. Cl.
*G06T 9/00* (2006.01)
*G06T 7/136* (2017.01)

(52) U.S. Cl.
CPC .............. *G06T 9/001* (2013.01); *G06T 7/136* (2017.01); *G06T 2207/10028* (2013.01); *G06T 2207/20224* (2013.01)

(58) Field of Classification Search
CPC ..................... G06T 9/001; G06T 7/136; G06T 2207/10028; G06T 2207/20224;

(Continued)

(56) References Cited

U.S. PATENT DOCUMENTS

2001/0055337 A1   12/2001   Matsuzaki et al.
2017/0249401 A1   8/2017    Eckart et al.
(Continued)

FOREIGN PATENT DOCUMENTS

CN   106407408 A   2/2017
CN   108335335 A   7/2018
(Continued)

OTHER PUBLICATIONS

ITU-T H.223, Jul. 2001, "Series H: Audiovisual and Multimedia Systems, Infrastructure of audiovisual services—Transmission multiplexing and synchronization, Multiplexing protocol for low bit rate multimedia communication," 74 pages.

(Continued)

*Primary Examiner* — Jianxun Yang
(74) *Attorney, Agent, or Firm* — Conley Rose, P.C.

(57) ABSTRACT

A point cloud encoding method includes grouping a to-be-coded point cloud group into a plurality of subgroups, where the grouping a to-be-coded point cloud group into a plurality of subgroups includes pre-grouping a plurality of frames of point clouds in the to-be-coded point cloud group to obtain a pre-grouped subgroup, and determining, based on feature information of the pre-grouped subgroup, that the pre-grouped subgroup is one of the plurality of subgroups, where the feature information represents a size of an occupancy map of a point cloud in the pre-grouped subgroup, and encoding a point cloud included in the plurality of subgroups.

20 Claims, 17 Drawing Sheets

(58) Field of Classification Search
CPC .... H04N 19/114; H04N 19/177; H04N 19/88; H04N 19/597; H04N 19/169; H04N 19/119; H04N 19/14; H04N 19/146; H04N 19/44
See application file for complete search history.

(56) References Cited

U.S. PATENT DOCUMENTS

| | | | |
|---|---|---|---|
| 2017/0347122 A1 | 11/2017 | Chou et al. | |
| 2018/0081034 A1 | 3/2018 | Guo | |
| 2018/0173239 A1 | 6/2018 | Yoon et al. | |
| 2018/0268570 A1 | 9/2018 | Budagavi et al. | |
| 2018/0288390 A1 | 10/2018 | Luo | |
| 2018/0324240 A1 | 11/2018 | Fleureau et al. | |
| 2019/0156520 A1* | 5/2019 | Mammou | G08B 1/00 |
| 2020/0151915 A1 | 5/2020 | Li et al. | |
| 2020/0394450 A1 | 12/2020 | Li et al. | |
| 2021/0029381 A1 | 1/2021 | Zhang et al. | |

FOREIGN PATENT DOCUMENTS

| | | |
|---|---|---|
| CN | 108632621 A | 10/2018 |
| CN | 108810571 A | 11/2018 |
| EP | 3399757 A1 | 11/2018 |
| JP | 2002010259 A | 1/2002 |
| JP | 2018198421 A | 12/2018 |
| WO | 2019196475 A1 | 10/2019 |

OTHER PUBLICATIONS

ITU-T H.263, Jan. 2005, "Series H: Audiovisual and Multimedia Systems, Infrastructure of audiovisual services—Coding of moving video, Video coding for low bit rate communication," 226 pages.

ITU-T H.264, Apr. 2017, "Series H: Audiovisual and Multimedia Systems, Infrastructure of audiovisual services—Coding of moving video, Advanced video coding for generic audiovisual services," 812 pages.

ITU-T H.265, Feb. 2018 ":Series H: Audiovisual and Multimedia Systems Infrastructure of audiovisual services—Coding of moving video, High efficiency video coding," 692 pages.

Aksu, E., "[PCC] On high level syntax of PCC," ISO/IEC JTC1/SC29/WG11 MPEG2018/ m43580, Jul. 2018, Ljubljana, Slovenia, 4 pages.

Zakharchenko, V., et al.,"Algorithm description of mpeg-pcc-tmc2 (v-pcc)," ISO/IEC JTC1/SC29/WG11 MPEG2018/N17767, Jul. 2018, Ljubljana, SI, 22 pages.

* cited by examiner

POINT CLOUD ENCODING METHOD AND ENCODER

CROSS-REFERENCE TO RELATED APPLICATIONS

This is a continuation of International Patent Application No. PCT/CN2019/124615 filed on Dec. 11, 2019, which claims priority to Chinese Patent Application No. 201811527959.5 filed on Dec. 13, 2018. The disclosures of the aforementioned applications are hereby incorporated by reference in their entireties.

TECHNICAL FIELD

This application relates to the field of coding technologies, and in particular, to a point cloud coding method and a codec.

BACKGROUND

With continuous development of three-dimensional (3D) sensor (for example, a 3D scanner) technologies, point cloud data collection is more convenient, and collected point cloud data has a larger scale. Therefore, how to effectively encode point cloud data becomes an urgent problem to be resolved.

SUMMARY

Embodiments of this application provide a point cloud encoding method and an encoder, to help improve encoding efficiency.

According to a first aspect, a point cloud encoding method is provided, including grouping a to-be-coded point cloud group into a plurality of subgroups, where the grouping a to-be-coded point cloud group into a plurality of subgroups includes pre-grouping a plurality of frames of point clouds in the to-be-coded point cloud group to obtain a pre-grouped subgroup, and determining, based on feature information of the pre-grouped subgroup, that the pre-grouped subgroup is one of the plurality of subgroups, where the feature information is used to represent a size of an occupancy map of a point cloud in the pre-grouped subgroup, and then encoding a point cloud included in the plurality of subgroups. The size of the occupancy map of the point cloud determines a size of a depth map and a size of a texture map of the point cloud, and the sizes of the occupancy map, the depth map, and the texture map of the point cloud are key factors that affect video coding efficiency in a point cloud encoding process. Therefore, in this technical solution, the subgroups into which the to-be-coded point cloud group is grouped are determined with reference to the size of the occupancy map of the point cloud in the pre-grouped subgroup. This helps improve video encoding efficiency, thereby improving point cloud coding efficiency.

In a possible design, an area, a height, or a width of the occupancy map of the point cloud is used to represent the size of the occupancy map of the point cloud.

In a possible design, the feature information of the pre-grouped subgroup may include at least one of the following: a size of a global occupancy map of the pre-grouped subgroup (that is, information 1), the size of the occupancy map of the point cloud in the pre-grouped subgroup (that is, information 2), and an area of a union patch occupancy map of the pre-grouped subgroup (that is, information 3). The information 1 and the information 3 may indirectly represent occupancy map size information of the point cloud in the subgroup. The information 2 may directly represent the occupancy map size information of the point cloud in the subgroup.

In a possible design, the size of the global occupancy map may be represented by a height of the global occupancy map. Certainly, this is not limited in this embodiment of this application.

In a possible design, the size of the occupancy map of the point cloud may be represented by a height of the occupancy map of the point cloud. Certainly, this is not limited in this embodiment of this application.

In a possible design, in a subgroup determining process, pre-grouping usually needs to be performed one or more times (for example, pre-grouping is performed by using a window sliding method or a dichotomy), and one pre-grouped subgroup may be determined each time pre-grouping is performed. It should be noted that, in some embodiments, pre-grouping performed at a specific time may be performed again, to re-obtain a pre-grouped subgroup.

In a possible design, the method further includes determining the feature information of the pre-grouped subgroup by using the global matching packing algorithm.

In a possible design, pre-grouping a plurality of frames of point clouds in the to-be-coded point cloud group to obtain a pre-grouped subgroup includes pre-grouping, for an $i^{th}$ time by using a $j^{th}$ frame of point cloud as a start point, point clouds that are not grouped in the to-be-coded point cloud group, to obtain an $i^{th}$ pre-grouped subgroup, where the $j^{th}$ frame of point cloud is a first frame of point cloud in the point clouds that are not grouped, i≥1, and i is an integer, j≥1, and j is an integer, and the $i^{th}$ pre-grouped subgroup includes one or more frames of point clouds starting from the $j^{th}$ frame of point cloud. Correspondingly, determining, based on feature information of the pre-grouped subgroup, that the pre-grouped subgroup is one of the plurality of subgroups includes determining, based on feature information of the $i^{th}$ pre-grouped subgroup, that the $i^{th}$ pre-grouped subgroup is one of the plurality of subgroups. It can be learned that in this embodiment of this application, a technical solution of determining a next subgroup based on an order of the point clouds in the to-be-coded point cloud group when a subgroup included in the to-be-coded point cloud group is determined is supported.

In a possible design, determining, based on feature information of the $i^{th}$ pre-grouped subgroup, that the $i^{th}$ pre-grouped subgroup is one of the plurality of subgroups includes determining, based on the feature information of the $i^{th}$ pre-grouped subgroup and feature information of an $(i+1)^{th}$ pre-grouped subgroup, that the $i^{th}$ pre-grouped subgroup is one of the plurality of subgroups.

In a possible design, determining, based on the feature information of the $i^{th}$ pre-grouped subgroup and feature information of an $(i+1)^{th}$ pre-grouped subgroup, that the $i^{th}$ pre-grouped subgroup is one of the plurality of subgroups includes determining that the $i^{th}$ pre-grouped subgroup is one of the plurality of subgroups when the feature information of the $i^{th}$ pre-grouped subgroup meets a preset condition and the feature information of the $(i+1)^{th}$ pre-grouped subgroup does not meet the preset condition. In this way, as many point clouds as possible in the to-be-coded point cloud group form a subgroup that meets the preset condition, to improve encoding efficiency when the point clouds in the subgroup are packed by using the global matching packing algorithm.

In a possible design, the feature information of the $i^{th}$ pre-grouped subgroup includes a size of a global occupancy map of the $i^{th}$ pre-grouped subgroup. Correspondingly, determining that the $i^{th}$ pre-grouped subgroup is one of the plurality of subgroups when the feature information of the $i^{th}$ pre-grouped subgroup meets a preset condition and the feature information of the $(i+1)^{th}$ pre-grouped subgroup does not meet the preset condition includes, when the size of the global occupancy map of the $i^{th}$ pre-grouped subgroup is less than or equal to a first threshold, and a size of a global occupancy map of the $(i+1)^{th}$ pre-grouped subgroup is greater than the first threshold, determining that the $i^{th}$ pre-grouped subgroup is one of the plurality of subgroups.

Optionally, the first threshold is a predefined value (for example, a fixed value). Alternatively, the first threshold is determined based on a maximum size that is obtained based on a candidate packing algorithm and that is of an occupancy map of the point cloud in the to-be-coded point cloud group.

In a possible design, the feature information of the $i^{th}$ pre-grouped subgroup includes a size of an occupancy map of a point cloud in the $i^{th}$ pre-grouped subgroup. Correspondingly, determining that the $i^{th}$ pre-grouped subgroup is one of the plurality of subgroups when the feature information of the $i^{th}$ pre-grouped subgroup meets a preset condition and the feature information of the $(i+1)^{th}$ pre-grouped subgroup does not meet the preset condition includes when a quantity of frames of large-size point clouds in the $i^{th}$ pre-grouped subgroup is less than or equal to a first preset quantity, and a quantity of frames of large-size point clouds in the $(i+1)^{th}$ pre-grouped subgroup is greater than the first preset quantity, determining that the $i^{th}$ pre-grouped subgroup is one of the plurality of subgroups, where the large-size point cloud is a point cloud whose occupancy map size is greater than or equal to a second threshold, or when an average value of a ratio of a size that is obtained based on the global matching packing algorithm and that is of the occupancy map of the point cloud in the $i^{th}$ pre-grouped subgroup to a size that is obtained based on a candidate packing algorithm and that is of the occupancy map of the point cloud in the $i^{th}$ pre-grouped subgroup is less than or equal to a third threshold, and an average value of a ratio of a size that is obtained based on the global matching packing algorithm and that is of an occupancy map of a point cloud in the $(i+1)^{th}$ pre-grouped subgroup to a size that is obtained based on the candidate packing algorithm and that is of the occupancy map of the point cloud in the $(i+1)^{th}$ pre-grouped subgroup is greater than the third threshold, determining that the $i^{th}$ pre-grouped subgroup is one of the plurality of subgroups.

Optionally, the second threshold is a predefined value (for example, a fixed value). Alternatively, the large-size point cloud is a point cloud whose occupancy map size obtained based on the global matching packing algorithm is greater than or equal to the second threshold, and the second threshold is determined based on a maximum size that is obtained based on the candidate packing algorithm and that is of an occupancy map of the point cloud in the to-be-coded point cloud group, or determined based on a size that is obtained based on the candidate packing algorithm and that is of an occupancy map of a current point cloud.

In a possible design, the feature information of the $i^{th}$ pre-grouped subgroup includes a size of a global occupancy map of the $i^{th}$ pre-grouped subgroup. Correspondingly, determining, based on the feature information of the $i^{th}$ pre-grouped subgroup and feature information of an $(i+1)^{th}$ pre-grouped subgroup, that the $i^{th}$ pre-grouped subgroup is one of the plurality of subgroups includes, when a size of a global occupancy map of the $(i+1)^{th}$ pre-grouped subgroup is decreased by greater than or equal to a fifth threshold compared with the size of the global occupancy map of the $i^{th}$ pre-grouped subgroup, it indicates that compared with that the $i^{th}$ pre-grouped subgroup is used as a subgroup, when the $(i+1)^{th}$ pre-grouped subgroup is used as a subgroup, point cloud encoding efficiency decreases greatly when packing is performed by using the global matching packing algorithm. In this case, it is determined that the $i^{th}$ pre-grouped subgroup is one of the plurality of subgroups. This is a technical solution proposed considering that a group of global matched patches in the $i^{th}$ pre-grouped subgroup are not global matched patches in the $(i+1)^{th}$ pre-grouped subgroup.

In a possible design, the feature information of the $i^{th}$ pre-grouped subgroup includes an area of a union patch occupancy map of the $i^{th}$ pre-grouped subgroup. Correspondingly, determining, based on the feature information of the $i^{th}$ pre-grouped subgroup and feature information of an $(i+1)^{th}$ pre-grouped subgroup, that the $i^{th}$ pre-grouped subgroup is one of the plurality of subgroups includes, when a total area of a union patch occupancy map of the $(i+1)^{th}$ pre-grouped subgroup is decreased by greater than or equal to a fourth threshold compared with a total area of the union patch occupancy map of the $i^{th}$ pre-grouped subgroup, it indicates that compared with that the $i^{th}$ pre-grouped subgroup is used as a subgroup, when the $(i+1)^{th}$ pre-grouped subgroup is used as a subgroup, point cloud encoding efficiency decreases greatly when packing is performed by using the global matching packing algorithm. In this case, it is determined that the $i^{th}$ pre-grouped subgroup is one of the plurality of subgroups. This is a technical solution proposed considering that a group of global matched patches in the $i^{th}$ pre-grouped subgroup are not global matched patches in the $(i+1)^{th}$ pre-grouped subgroup.

In a possible design, pre-grouping, for an $i^{th}$ time by using a $j^{th}$ frame of point cloud as a start point, point clouds that are not grouped in the to-be-coded point cloud group, to obtain an $i^{th}$ pre-grouped subgroup includes sliding, by using the $j^{th}$ frame of point cloud as a start point, a window for an $i^{th}$ time on the point clouds that are not grouped in the to-be-coded point cloud group, to obtain the $i^{th}$ pre-grouped subgroup, or performing, by using the $j^{th}$ frame of point cloud as a start point, a dichotomy for an $i^{th}$ time on the point clouds that are not grouped in the to-be-coded point cloud group, to obtain the $i^{th}$ pre-grouped subgroup. Step sizes used to slide the window for different times may be fixed or variable. Optionally, a step size used to slide the window for an $i_1^{th}$ time is greater than or equal to a step size used to slide the window for an $i_2^{th}$ time, where $1 \leq i_1 < i_2 \leq i$, and both $i_1$ and $i_2$ are integers. Further optionally, the method further includes obtaining, according to a formula $N[i+1]=N[i] \times c$, a step size $N[i+1]$ used to slide the window for an $(i+1)^{th}$ time, where $N[i]$ is a step size used to slide the window for the $i^{th}$ time, c is determined based on the quantity of frames of large-size point clouds in the $i^{th}$ pre-grouped subgroup, and the large-size point cloud is the point cloud whose occupancy map size is greater than or equal to the second threshold. For example, c meets the following formula $c=(a-b)/a$, where a is the first preset quantity, and b is the quantity of frames of large-size point clouds in the $i^{th}$ pre-grouped subgroup.

In a possible design, pre-grouping, for an $i^{th}$ time by using a $j^{th}$ frame of point cloud as a start point, point clouds that are not grouped in the to-be-coded point cloud group, to obtain an $i^{th}$ pre-grouped subgroup includes sliding, by using the $j^{th}$ frame of point cloud as a start point, a window for an $i^{th}$ time on the point clouds that are not grouped in the to-be-coded point cloud group, to obtain the $i^{th}$ pre-grouped subgroup. Correspondingly, determining, based on feature information of the $i^{th}$ pre-grouped subgroup, that the $i^{th}$ pre-grouped subgroup is one of the plurality of subgroups includes when the feature information of the $i^{th}$ pre-grouped subgroup meets a preset condition, and feature information of an $(i+1)^{th}$ pre-grouped subgroup does not meet the preset condition, re-obtaining the $(i+1)^{th}$ pre-grouped subgroup by using a second step size, where the second step size is less than a first step size, and the first step size is a step size used when the $(i+1)^{th}$ pre-grouped subgroup is obtained for a first time, and if feature information of a re-obtained $(i+1)^{th}$ pre-grouped subgroup does not meet the preset condition, re-obtaining the $(i+1)^{th}$ pre-grouped subgroup by using a third step size, where the third step size is less than the second step size, and by analogy, when a quantity of times of re-obtaining the $(i+1)^{th}$ pre-grouped subgroup reaches a preset quantity of times, or a step size of a latest re-obtained $(i+1)^{th}$ pre-grouped subgroup is less than or equal to a preset step size, if feature information of the latest re-obtained $(i+1)^{th}$ pre-grouped subgroup does not meet the preset condition, determining that the $i^{th}$ pre-grouped subgroup is one of the plurality of subgroups. In this way, as many point clouds as possible in the to-be-coded point cloud group form a subgroup that meets the preset condition, to improve encoding efficiency when the point clouds in the subgroup are packed by using a global matching packing algorithm.

Based on this, optionally, the grouping a to-be-coded point cloud group into a plurality of subgroups further includes when a difference between a quantity of frames of point clouds included in the re-obtained $(i+1)^{th}$ pre-grouped subgroup and a quantity of frames of point clouds included in the $(i+1)^{th}$ pre-grouped subgroup obtained for the first time is less than or equal to a second preset quantity, determining that the $(i+1)^{th}$ pre-grouped subgroup re-obtained this time is a subgroup, or when a difference between a quantity of frames of point clouds included in the re-obtained $(i+1)^{th}$ pre-grouped subgroup and a quantity of frames of point clouds included in the $(i+1)^{th}$ pre-grouped subgroup obtained for the first time is greater than a second preset quantity, obtaining an $(i+2)^{th}$ pre-grouped subgroup by using a fourth step size, where a sum of the second step size and the fourth step size is less than the first step size, if feature information of the $(i+2)^{th}$ pre-grouped subgroup meets the preset condition, obtaining an $(i+3)^{th}$ pre-grouped subgroup by using a fifth step size, where a sum of the second step size, the fourth step size, and the fifth step size is less than the first step size, and by analogy, when a difference between a quantity of frames of point clouds included in an obtained $(i+k)^{th}$ pre-grouped subgroup and the quantity of frames of point clouds included in the $(i+1)^{th}$ pre-grouped subgroup obtained for the first time is less than or equal to the second preset quantity, if feature information of the $(i+k)^{th}$ pre-grouped subgroup meets the preset condition, determining that the $(i+k)^{th}$ pre-grouped subgroup is one of the plurality of subgroups, where k≥2, and k is an integer. In this way, as many point clouds as possible in the to-be-coded point cloud group form a subgroup that meets the preset condition, to improve encoding efficiency when the point clouds in the subgroup are packed by using the global matching packing algorithm.

In a possible design, pre-grouping, for an $i^{th}$ time by using a $j^{th}$ frame of point cloud as a start point, point clouds that are not grouped in the to-be-coded point cloud group, to obtain an $i^{th}$ pre-grouped subgroup includes performing, by using the $j^{th}$ frame of point cloud as a start point, a dichotomy for an $i^{th}$ time on the point clouds that are not grouped in the to-be-coded point cloud group, to obtain the $i^{th}$ pre-grouped subgroup. Correspondingly, determining, based on feature information of the $i^{th}$ pre-grouped subgroup, that the pre-grouped subgroup is one of the plurality of subgroups includes, if the feature information of the $i^{th}$ pre-grouped subgroup meets a preset condition, determining that the $i^{th}$ pre-grouped subgroup is one of the plurality of subgroups.

In a possible design, the feature information of the $i^{th}$ pre-grouped subgroup includes a size of a global occupancy map of the $i^{th}$ pre-grouped subgroup. Correspondingly, that the feature information of the $i^{th}$ pre-grouped subgroup meets a preset condition includes that the size of the global occupancy map of the $i^{th}$ pre-grouped subgroup is less than or equal to a first threshold, and/or, a size of a global occupancy map of the $(i+1)^{th}$ pre-grouped subgroup is decreased by greater than or equal to a fifth threshold compared with the size of the global occupancy map of the $i^{th}$ pre-grouped subgroup.

In a possible design, the feature information of the $i^{th}$ pre-grouped subgroup includes a size of an occupancy map of a point cloud in the $i^{th}$ pre-grouped subgroup. Correspondingly, that the feature information of the $i^{th}$ pre-grouped subgroup meets a preset condition includes a quantity of frames of large-size point clouds in the $i^{th}$ pre-grouped subgroup is less than or equal to a first preset quantity, where the large-size point cloud is a point cloud whose occupancy map size is greater than or equal to a second threshold, or an average value of a ratio of a size that is obtained based on the global matching packing algorithm and that is of the occupancy map of the point cloud in the $i^{th}$ pre-grouped subgroup to a size that is obtained based on a candidate packing algorithm and that is of the occupancy map of the point cloud in the $i^{th}$ pre-grouped subgroup is less than or equal to a third threshold. For an implementation of the second threshold, refer to the foregoing description.

In a possible design, the feature information of the $i^{th}$ pre-grouped subgroup includes an area of a union patch occupancy map of the $i^{th}$ pre-grouped subgroup. Correspondingly, that the feature information of the $i^{th}$ pre-grouped subgroup meets a preset condition includes a total area of a union patch occupancy map of the $(i+1)^{th}$ pre-grouped subgroup is decreased by greater than or equal to a fourth threshold compared with a total area of the union patch occupancy map of the $i^{th}$ pre-grouped subgroup.

It may be understood that the foregoing provides specific implementations in which the feature information of the $i^{th}$ pre-grouped subgroup meets the preset condition. Correspondingly, a specific implementation in which the feature information of the $i^{th}$ pre-grouped subgroup does not meet the preset condition may be obtained, and a specific implementation of whether feature information of an $(i+k)^{th}$ pre-grouped subgroup meets the preset condition may be obtained, where k≥1 herein, and k is an integer.

According to a second aspect, an encoder is provided, including a grouping module and an encoding module. The grouping module is configured to group a to-be-coded point cloud group into a plurality of subgroups, where grouping the to-be-coded point cloud group into the plurality of subgroups includes pre-grouping a plurality of frames of point clouds in the to-be-coded point cloud group to obtain a pre-grouped subgroup, and determining, based on feature information of the pre-grouped subgroup, that the pre-grouped subgroup is one of the plurality of subgroups, where the feature information is used to represent a size of an occupancy map of a point cloud in the pre-grouped subgroup. The encoding module is configured to encode a point cloud included in the plurality of subgroups.

For a specific implementation of the steps performed by the grouping module or explanations of related content, refer to descriptions in the first aspect. Details are not described herein again.

According to a third aspect, a point cloud data encoding device is provided. The device may include a memory and an encoder. The memory is configured to store point cloud data. The encoder is configured to perform the point cloud encoding method provided in any one of the first aspect or the possible designs of the first aspect.

According to a fourth aspect, an encoding device is provided, including a nonvolatile memory and a processor that are coupled to each other. The processor invokes program code stored in the memory to perform some or all steps of the point cloud encoding method provided in any one of the first aspect or the possible designs of the first aspect.

According to a fifth aspect, an encoding apparatus is provided. The apparatus includes a memory and a processor. The memory is configured to store program code. The processor is configured to invoke the program code to perform some or all steps of the point cloud encoding method provided in any one of the first aspect or the possible designs of the first aspect.

According to a sixth aspect, a computer-readable storage medium is provided. The computer-readable storage medium stores program code. When the program code is run on a computer, some or all steps of the point cloud encoding method provided in any one of the first aspect or the possible designs of the first aspect are performed.

According to a seventh aspect, a computer program product is provided. When the computer program product runs on a computer, the computer is enabled to perform some or all steps of the point cloud encoding method provided in any one of the first aspect or the possible designs of the first aspect.

It should be understood that, for beneficial effects of the encoder, the point cloud data encoding device, the encoding device, the encoding apparatus, the computer-readable storage medium, or the computer program product provided above, refer to beneficial effects of the corresponding method embodiment provided in the first aspect. Details are not described herein again.

DESCRIPTION OF EMBODIMENTS

Figure 1:
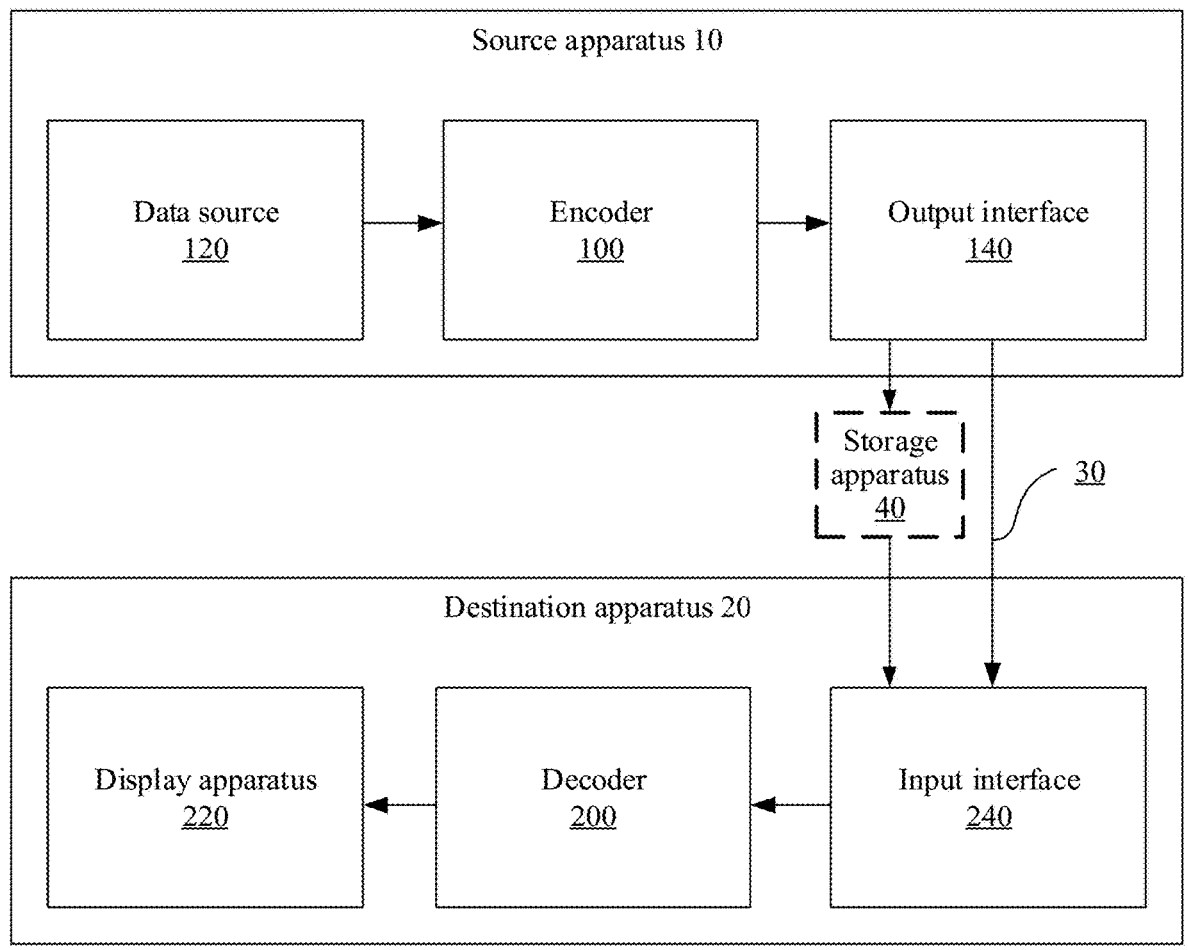
FIG. 1 is a schematic block diagram of an example point cloud coding system that is applicable to an embodiment of this application.

FIG. 1 is a schematic block diagram of an example point cloud coding system 1 that is applicable to an embodiment of this application. The term "point cloud coding" or "coding" may generally be point cloud encoding or point cloud decoding. An encoder 100 in the point cloud coding system 1 may encode a to-be-coded point cloud according to any point cloud encoding method provided in this application. A decoder 200 in the point cloud coding system 1 may decode a to-be-coded point cloud according to a point cloud decoding method, provided in this application, corresponding to a point cloud coding method used by the encoder.

As shown in FIG. 1, the point cloud coding system 1 includes a source apparatus 10 and a destination apparatus 20. The source apparatus 10 generates encoded point cloud data. Therefore, the source apparatus 10 may be referred to as a point cloud encoding apparatus. The destination apparatus 20 may decode the encoded point cloud data generated by the source apparatus 10. Therefore, the destination apparatus 20 may be referred to as a point cloud decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store desired program code in a form of an instruction or a data structure that can be accessed by a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, a vehicle-mounted computer, and a similar apparatus.

The destination apparatus 20 may receive the encoded point cloud data from the source apparatus 10 over a link 30. The link 30 may include one or more media or apparatuses that can move the encoded point cloud data from the source apparatus 10 to the destination apparatus 20. In an example, the link 30 may include one or more communications media that enable the source apparatus 10 to directly send the encoded point cloud data to the destination apparatus 20 in real time. In this example, the source apparatus 10 may modulate the encoded point cloud data according to a communication standard (for example, a wireless communication protocol), and may send modulated point cloud data to the destination apparatus 20. The one or more communications media may include a wireless and/or wired communications medium, for example, a radio frequency (RF) spectrum or one or more physical transmission lines. The one or more communications media may constitute a part of a packet-based network, and the packet-based network is, for example, a local area network, a wide area network, or a global network (for example, the Internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded point cloud data may be accessed from the storage apparatus 40 through an input interface 240. The storage apparatus 40 may include any one of a plurality of distributed data storage media or locally accessed data storage media, for example, a hard drive, a BLU-RAY DISC, a DIGITAL VERSATILE DISC (DVD), a compact disc (CD) ROM (CD-ROM), a flash memory, a volatile or nonvolatile memory, or any other appropriate digital storage medium configured to store the encoded point cloud data.

In another example, the storage apparatus 40 may correspond to a file server or another intermediate storage apparatus that can store the encoded point cloud data generated by the source apparatus 10. The destination apparatus 20 may access the stored point cloud data through streaming transmission or downloading from the storage apparatus 40. The file server may be any type of server that can store the encoded point cloud data and send the encoded point cloud data to the destination apparatus 20. An example of the file server includes a network server (for example, used for a website), a File Transfer Protocol (FTP) server, a network attached storage (NAS) apparatus, or a local disk drive. The destination apparatus 20 may access the encoded point cloud data through any standard data connection (including an Internet connection). The standard data connection may include a radio channel (for example, a WI-FI connection), a wired connection (for example, a digital subscriber line (DSL) or a cable modem), or a combination thereof that is suitable for accessing the encoded point cloud data stored in the file server. Transmission of the encoded point cloud data from the storage apparatus 40 may be streaming transmission, downloading transmission, or a combination thereof.

The point cloud coding system 1 described in FIG. 1 is merely an example, and the technologies in this application are applicable to a point cloud coding (for example, point cloud encoding or point cloud decoding) apparatus that does not necessarily include any data communication between a point cloud encoding apparatus and a point cloud decoding apparatus. In another example, data is retrieved from a local memory, transmitted on a network in a streaming manner, and the like. The point cloud encoding apparatus may encode the data and store the data in the memory, and/or the point cloud decoding apparatus may retrieve the data from the memory and decode the data. In many examples, apparatuses that only encode data and store the data in the memory and/or retrieve the data from the memory and decode the data and that do not communicate with each other perform encoding and decoding.

In the example in FIG. 1, the source apparatus 10 includes a data source 120, the encoder 100, and the output interface 140. In some examples, the output interface 140 may include a modulator/demodulator (a modem) and/or a transmitter. The data source 120 may include a point cloud capture apparatus (for example, a camera), a point cloud archive including previously captured point cloud data, a point cloud feed-in interface configured to receive point cloud data from a point cloud content provider, and/or a computer graphics system configured to generate point cloud data, or a combination of these sources of point cloud data.

The encoder 100 may encode the point cloud data from the data source 120. In some examples, the source apparatus 10 directly sends the encoded point cloud data to the destination apparatus 20 through the output interface 140. In another example, the encoded point cloud data may alternatively be stored in the storage apparatus 40, so that the destination apparatus 20 subsequently accesses the encoded point cloud data for decoding and/or playing.

In the example in FIG. 1, the destination apparatus 20 includes the input interface 240, the decoder 200, and a display apparatus 220. In some examples, the input interface 240 includes a receiver and/or a modem. The input interface 240 may receive the encoded point cloud data over the link 30 and/or from the storage apparatus 40. The display apparatus 220 may be integrated with the destination apparatus 20 or may be located outside the destination apparatus 20. Usually, the display apparatus 220 displays decoded point cloud data. There may be a plurality of types of display apparatuses 220. For example, the display apparatus 220 may be a liquid-crystal display (LCD), a plasma display, an organic light-emitting diode (OLED) display, or another type of display apparatus.

Although not shown in FIG. 1, in some aspects, the encoder 100 and the decoder 200 may be respectively integrated with an audio encoder and an audio decoder, and may include an appropriate multiplexer-demultiplexer (MUX-DEMUX) unit or other hardware and software, to process encoding of audio and a video in a combined data stream or a separate data stream. In some examples, if appropriate, the MUX-DEMUX unit may comply with the International Telecommunication Union (ITU) H.223 multiplexer protocol or another protocol such as a User Datagram Protocol (UDP).

The encoder 100 and the decoder 200 each may be implemented as, for example, any one of a plurality of circuits one or more microprocessors, digital signal processors (DSPs), application-specific integrated circuits (ASICs), field-programmable gate arrays (FPGAs), discrete logics, hardware, or any combination thereof. If this application is implemented partially by using software, the apparatus may store, in an appropriate nonvolatile computer-readable storage medium, instructions used for the software, and may use one or more processors to execute the instructions in hardware, to implement the technologies in this application. Any one of the foregoing content (including hardware, software, a combination of hardware and software, and the like) may be considered as one or more processors. The encoder 100 and the decoder 200 each may be included in one or more encoders or decoders, and the encoder or the decoder may be integrated as a part of a combined encoder/decoder (codec) in a corresponding apparatus.

In this application, the encoder 100 may be generally referred to as another apparatus that "signals" or "sends" some information to, for example, the decoder 200. The term "signal" or "send" may generally refer to transmission of a syntactic element and/or other data used for decoding compressed point cloud data. The transmission may occur in real time or almost in real time. Alternatively, the communication may occur after a period of time. For example, the communication may occur when a syntactic element in an encoded bitstream is stored in a computer-readable storage medium during encoding, and the decoding apparatus may then retrieve the syntactic element at any time after the syntactic element is stored in the medium.

Figure 2:
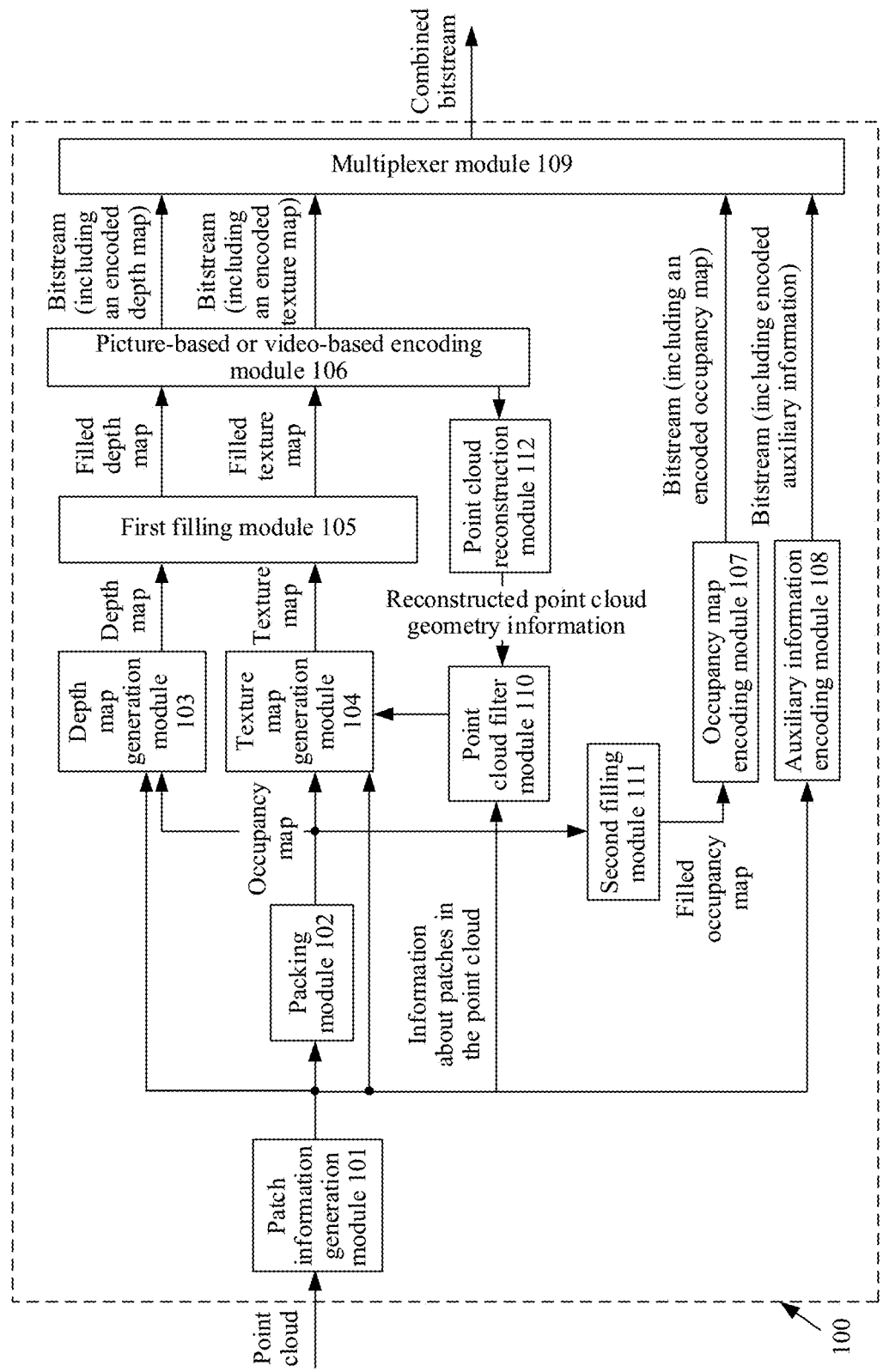
FIG. 2 is a schematic block diagram of an example encoder that is applicable to an embodiment of this application.

FIG. 2 is a schematic block diagram of an example encoder 100 that is applicable to an embodiment of this application. A Moving Picture Expert Group (MPEG) point cloud compression (PCC) encoding framework is used as an example for description in FIG. 2. In the example in FIG. 2, the encoder 100 may include a patch information generation module 101, a packing module 102, a depth map generation module 103, a texture map generation module 104, a first filling module 105, an image-based or video-based encoding module 106, an occupancy map encoding module 107, an auxiliary information encoding module 108, a multiplexer module 109, and the like. In addition, the encoder 100 may further include a point cloud filtering module 110, a second filling module 111, a point cloud reconstruction module 112, and the like. Details are as follows.

The patch information generation module 101 is configured to partition a frame of point cloud into a plurality of patches by using a method, and obtain related information of the generated patches and the like. The patch is a set including some points in one frame of point cloud. Usually, one connected region corresponds to one patch. The related information of the patches may include but is not limited to at least one of the following information a quantity of the patches obtained by partitioning the point cloud, location information of each patch in a 3D space, an index of a normal coordinate axis of each patch, and a depth map generated when each patch is projected from the 3D space to a two-dimensional (2D) space, a size of a depth map of each patch (for example, a width and a height of the depth map), an occupancy map generated when each patch is projected from the 3D space to the 2D space, and the like. Some of the related information, such as the quantity of the patches obtained by partitioning the point cloud, the index of the normal coordinate axis of each patch, the size of the depth map of each patch, the location information of each patch in the point cloud, and size information of the occupancy map of each patch may be used as auxiliary information and is sent to the auxiliary information encoding module 108 for encoding (that is, compression encoding). The occupancy map of each patch may be sent to the packing module 102 for packing. In addition, information about a specific location of each patch in the occupancy map of the point cloud, a depth map of each patch, and the like may be sent to the depth map generation module 103.

After the packing module 102 obtains the occupancy map of the point cloud, the second filling module 111 may fill the occupancy map of the point cloud and then send a filled occupancy map of the point cloud to the occupancy map encoding module 107 for encoding. In addition, the occupancy map of the point cloud may be used to guide the depth map generation module 103 to generate a depth map of the point cloud and guide the texture map generation module 104 to generate a texture map of the point cloud.

Figures 3A, 3B, 3C:
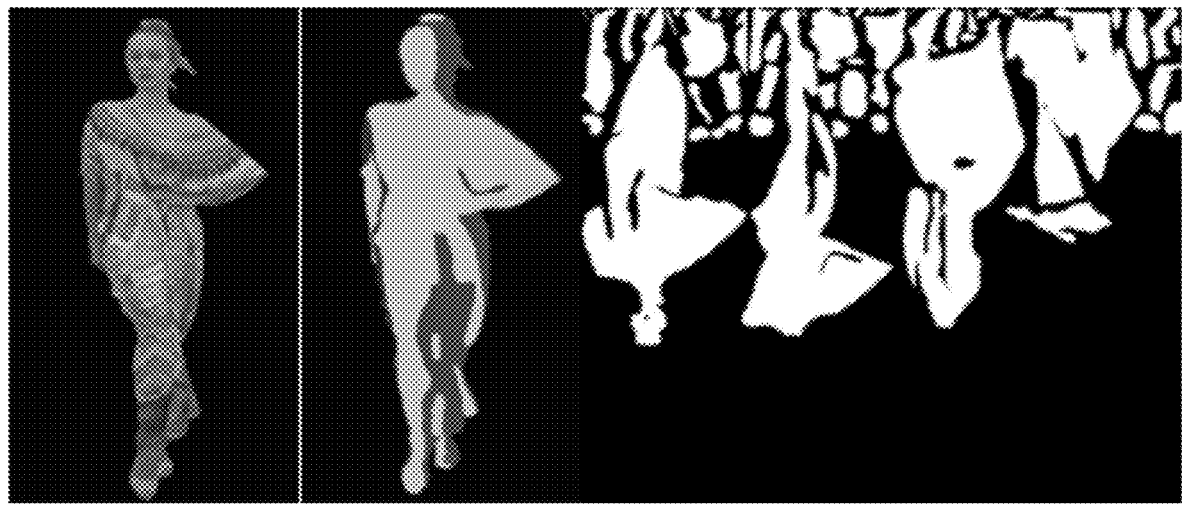
FIG. 3A, FIG. 3B, and FIG. 3C are schematic diagrams of a point cloud, patches of the point cloud, and an occupancy map of the point cloud that are applicable to an embodiment of this application.

FIG. 3A to FIG. 3C are schematic diagrams of a point cloud, patches of the point cloud, and an occupancy map of the point cloud that are applicable to an embodiment of this application. FIG. 3A is a schematic diagram of a frame of point cloud. FIG. 3B is a schematic diagram of patches, of the point cloud, that is obtained based on FIG. 3A. FIG. 3C is a schematic diagram of an occupancy map, of the point cloud, obtained by packing occupancy maps of the patches obtained by mapping the patches shown in FIG. 3B onto a 2D plane.

The depth map generation module 103 is configured to generate a depth map of the point cloud based on the occupancy map of the point cloud, and the occupancy map and depth information of each patch in the point cloud, and send the generated depth map to the first filling module 105, so that the first filling module 105 fills empty pixels in the depth map, to obtain a filled depth map.

The texture map generation module 104 is configured to generate a texture map of the point cloud based on the occupancy map of the point cloud, and the occupancy map and texture information of each patch in the point cloud, and send the generated texture map to the first filling module 105, so that the first filling module 105 fills empty pixels in the received texture map, to obtain a filled texture map.

The first filling module 105 sends the filled depth map and the filled texture map to the image-based or video-based encoding module 106 for image-based or video-based encoding. Subsequent processes are as follows.

On the one hand, the image-based or video-based encoding module 106, the occupancy map encoding module 107, and the auxiliary information encoding module 108 send obtained encoding results (that is, bitstreams) to the multiplexer module 109, and the multiplexer module 109 combines the encoding results into one bitstream, where the bitstream may be sent to the output interface 140.

On the other hand, the image-based or video-based encoding module 106 sends an obtained encoding result (that is, a bitstream) to the point cloud reconstruction module 112 for point cloud reconstruction, to obtain a reconstructed point cloud (that is, obtain reconstructed geometry information of the point cloud). Further, video decoding is performed on an encoded depth map obtained by the image-based or video-based encoding module 106, to obtain a decoded depth map of the point cloud, and the reconstructed geometry information of the point cloud is obtained by using the decoded depth map, the occupancy map of the point cloud, and auxiliary information of each patch. The geometry information of the point cloud refers to a coordinate value of a point in the point cloud (for example, each point in the point cloud) in the 3D space.

Optionally, the point cloud reconstruction module 112 may further send texture information of the point cloud and the reconstructed geometry information of the point cloud to a coloring module. The coloring module is configured to color a reconstructed point cloud to obtain texture information of the reconstructed point cloud.

Optionally, the texture map generation module 104 may further generate the texture map of the point cloud based on information that is obtained by the point cloud filter module 110 by filtering the reconstructed geometry information of the point cloud.

It may be understood that the encoder 100 shown in FIG. 2 is merely an example. In a specific implementation, the encoder 100 may include more or fewer modules than those shown in FIG. 2. This is not limited in this embodiment of this application.

In an example, when being applied to this embodiment of this application, the packing module 102 may include a grouping submodule (not shown) and a packing submodule (not shown). The grouping submodule is configured to pre-group a to-be-coded point cloud group, to obtain a pre-grouped subgroup. The packing submodule is configured to pack an occupancy map of a patch in a point cloud in the pre-grouped subgroup based on a preset packing algorithm (for example, a global matching packing algorithm), and send feature information, obtained in a packing process or after packing, of the pre-grouped subgroup to the grouping submodule. The grouping submodule groups the to-be-coded point cloud group based on the feature information. Corresponding examples are as follows.

In an example, the packing module 102 groups the to-be-coded point cloud group into a plurality of subgroups. In a process of grouping the to-be-coded point cloud group, an occupancy map of a point cloud included in the plurality of subgroups is generated, and the occupancy map of the point cloud is sent to the depth map generation module 103, the texture map generation module 104 and the second filling module 111. In this case, the modules that receive the occupancy map of the point cloud and a module that is connected to or communicates with the modules cooperate with each other to complete an encoding function.

In another example, grouping and packing performed by the packing module 102 are relatively independent of each other. Correspondingly, the packing module 102 may include the grouping submodule (not shown) and the packing submodule (not shown). After grouping the to-be-coded point cloud group, the grouping submodule sends a grouping result to the packing submodule, and the packing submodule performs a packing operation based on the grouping result, to obtain an occupancy map of a point cloud included in the plurality of subgroups. The occupancy map of the point cloud is sent to the depth map generation module 103, the texture map generation module 104, and the second filling module 111. In this case, the packing submodule, the modules that receive the occupancy map of the point cloud, and a module that is connected to or communicates with the modules cooperate with each other to complete an encoding function.

Figure 4:
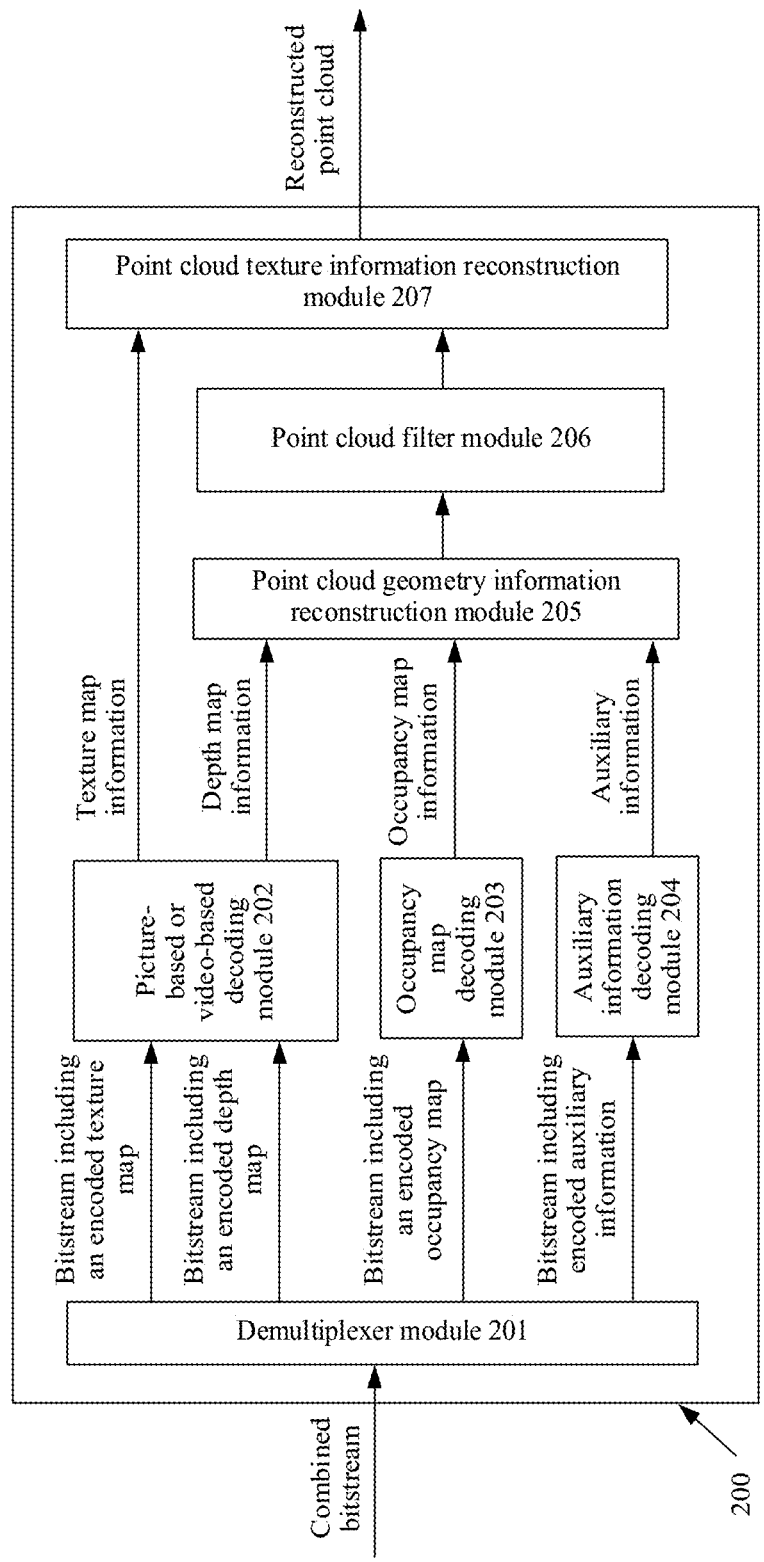
FIG. 4 is a schematic block diagram of an example decoder that is applicable to an embodiment of this application.

FIG. 4 is a schematic block diagram of an example decoder 200 that is applicable to an embodiment of this application. An MPEG PCC decoding framework is used as an example for description in FIG. 4. In the example in FIG. 4, the decoder 200 may include a demultiplexer module 201, an image-based or video-based decoding module 202, an occupancy map decoding module 203, an auxiliary information decoding module 204, a point cloud geometry information reconstruction module 205, a point cloud filter module 206, and a point cloud texture information reconstruction module 207. Details are as follows.

The demultiplexer module 201 is configured to send an input bitstream (that is, a combined bitstream) to a corresponding decoding module. Further, a bitstream including an encoded texture map and a bitstream including an encoded depth map are sent to the image-based or video-based decoding module 202, a bitstream including an encoded occupancy map is sent to the occupancy map decoding module 203, and a bitstream including encoded auxiliary information is sent to the auxiliary information decoding module 204.

The image-based or video-based decoding module 202 is configured to decode the received encoded texture map and encoded depth map, and then send texture map information obtained through decoding to the point cloud texture information reconstruction module 207, and send depth map information obtained through decoding to the point cloud geometry information reconstruction module 205. The occupancy map decoding module 203 is configured to decode the received bitstream including the encoded occupancy map, and send occupancy map information obtained through decoding to the point cloud geometry information reconstruction module 205. The auxiliary information decoding module 204 is configured to decode the received encoded auxiliary information, and send, to the point cloud geometry information reconstruction module 205, information that is obtained through decoding and that indicates the auxiliary information.

The point cloud geometry information reconstruction module 205 is configured to reconstruct point cloud geometry information based on the received occupancy map information and auxiliary information. After being filtered by the point cloud filter module 206, reconstructed point cloud geometry information is sent to the point cloud texture information reconstruction module 207.

The point cloud texture information reconstruction module 207 is configured to reconstruct texture information of the point cloud, to obtain a reconstructed point cloud.

It can be understood that the decoder 200 shown in FIG. 4 is merely an example. In a specific implementation, the decoder 200 may include more or fewer modules than those shown in FIG. 4. This is not limited in this embodiment of this application.

For ease of understanding of the technical solutions provided in the embodiments of this application, the following describes technologies and terms used in the embodiments of this application.

An anchor algorithm is a packing algorithm. Further, patches of a frame of point cloud are arranged in a specific order, for example, arranged in descending order (or ascending order) of widths/heights of occupancy maps of the patches. Then, the occupancy maps of the patches are sequentially inserted into an available region of an occupancy map of the point cloud in the order of the arranged patches, to obtain the occupancy map of the point cloud.

A global matching packing algorithm is a packing algorithm in which packing is performed in a unit of a plurality of frames of point clouds, so that a location that is of an occupancy map of any global matched patch in any one of the plurality of frames of point clouds and that is in an occupancy map of the frame of point cloud corresponds to a location that is of an occupancy map of a global matched patch that has a matching relationship with the foregoing global matched patch and that is in an occupancy map of a point cloud in which the global matched patch is located. Further, a global matching packing algorithm applicable to an embodiment of this application may include the following steps.

Step 1: Obtain a global matched patch in a point cloud group. The point cloud group includes N frames of point clouds. N≥2, and N is an integer.

A global matched patch in a frame of point cloud is a patch that is in the frame of point cloud and that has a matching relationship with a patch that can be found in each frame of point cloud other than the frame of point cloud in a point cloud group. In addition, a patch having a matching relationship with the patch is a global matched patch. A patch having a matching relationship with a patch is a matched patch of a target patch, where the target patch is the patch or a matched patch of the patch. Optionally, a matched patch, in another frame of point cloud, of a patch in a frame of point cloud may be a patch that is in the other frame of point cloud and whose intersection over union (IoU) with the patch is the largest and greater than or equal to a preset threshold.

A quantity of patches having a matching relationship with any global matched patch is N−1.

Step 2: Determine M union patch occupancy maps (that is, union occupancy maps) corresponding to M sets, where each set includes N global matched patches, and the N global matched patches are patches having a matching relationship in the N frames of point clouds, and optionally, a union patch occupancy map corresponding to an $m^{th}$ set is a union set of occupancy maps of all global matched patches in the $m^{th}$ set, where 1≤m≤M, and both m and M are integers.

That N global matched patches included in one set are patches having a matching relationship in N frames of point clouds may be understood as each of the N global matched patches is from (or belongs to) one frame of point cloud, different global matched patches are from different point clouds, and the N global matched patches have a matching relationship.

A union patch occupancy map corresponding to a set to which a global matched patch belongs includes an occupancy map of the global matched patch.

It should be noted that, in this embodiment of this application, global matched patches that are used to obtain a union patch occupancy map and that have a matching relationship are referred to as "a group of global matched patches (or a global matched patch group)". A general description is provided herein, and details are not described below.

Step 3: Pack the M union patch occupancy maps to obtain a global occupancy map (that is, a final occupancy map), where the global occupancy map is used to determine locations of the M union patch occupancy maps in the global occupancy map, and a packing process may be considered as a process of updating the global occupancy map. For example, the M union occupancy maps are arranged in an available space in the global occupancy map in an order from top to bottom and left to right, to obtain the final occupancy map.

Step 4: Pack each of the N frames of point clouds to obtain occupancy maps of the N frames of point clouds, where a location (a first location) that is of an occupancy map of an $m^{th}$ global matched patch in an $n^{th}$ frame of point cloud and that is in an occupancy map of the $n^{th}$ frame of point cloud corresponds to a location (a second location) that is of an $m^{th}$ union patch occupancy map in the M union patch occupancy maps and that is in the global occupancy map, 1≤n≤N, and n is an integer.

That the first location corresponds to the second location may include the following. Coordinate values of the first location are the same as coordinate values of the second location, or coordinate values of the first location in a coordinate system including the first location are substantially the same as coordinate values of the second location in a coordinate system including the second location, or coordinate values of the first location are different from coordinate values of the second location, but a location range including the second location includes a location range including the first location. The coordinate values of the first location may be represented by location coordinates, of the occupancy map of the $m^{th}$ global matched patch in the $n^{th}$ frame of point cloud, in the occupancy map of the $n^{th}$ frame of point cloud. The coordinate values of the second location may be represented by location coordinates of the $m^{th}$ union patch occupancy map in the global occupancy map. The location range including the first location is a region occupied by the occupancy map of the $m^{th}$ global matched patch, and the location range including the second location is a region occupied by the $m^{th}$ union patch occupancy map.

In an example, for explanations of related content and descriptions of a specific implementation in the global matching packing algorithm described above, reference may be made to, for example, but not limited to, another patent previously applied for by the applicant.

The term "at least one (type)" in the embodiments of this application includes one (type) or more (types). "A plurality of (types)" means two (types) or more than two (types). For example, at least one of A, B, and C includes the following cases: only A exists, only B exists, only C exists, both A and B exist, both A and C exist, both B and C exist, and A, B, and C exist. In the descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. "A plurality of" means two or more than two. In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms, such as "first" and "second", are not intended to limit a quantity or an execution sequence, and the terms, such as "first" and "second", do not indicate a definite difference.

It may be understood that, compared with using the anchor algorithm, occupancy maps that are of patches having a matching relationship in a plurality of point clouds and that are obtained through packing by using the global matching packing algorithm correspond to locations in occupancy maps of the point clouds in which the patches are located. This helps improve point cloud coding performance. However, a size that is of an occupancy map of a point cloud and that is obtained by using the global matching packing algorithm is generally larger than a size obtained by using the anchor algorithm. This reduces point cloud coding performance. Based on this, a basic idea of some embodiments provided in the embodiments of this application is as follows. Impact of the two aspects on the point cloud coding performance is balanced, so that when a subgroup that is in a to-be-coded point cloud group and that includes at least two frames of point clouds is packed based on the global matching packing algorithm, overall performance is relatively high. The anchor algorithm herein may be replaced with another packing algorithm.

In some other embodiments of this application, coding performance of a plurality of packing algorithms does not need to be compared. Instead, a to-be-coded point cloud group is directly grouped based on one packing algorithm. The packing algorithm is, for example, but is not limited to, the global matching packing algorithm.

The following describes a point cloud encoding method provided in the embodiments of this application. It should be noted that, with reference to the point cloud coding system shown in FIG. 1, any following point cloud encoding method may be performed by the source apparatus 10 in the point cloud coding system, and furthermore, performed by the encoder 100 in the source apparatus 10.

Figure 5:
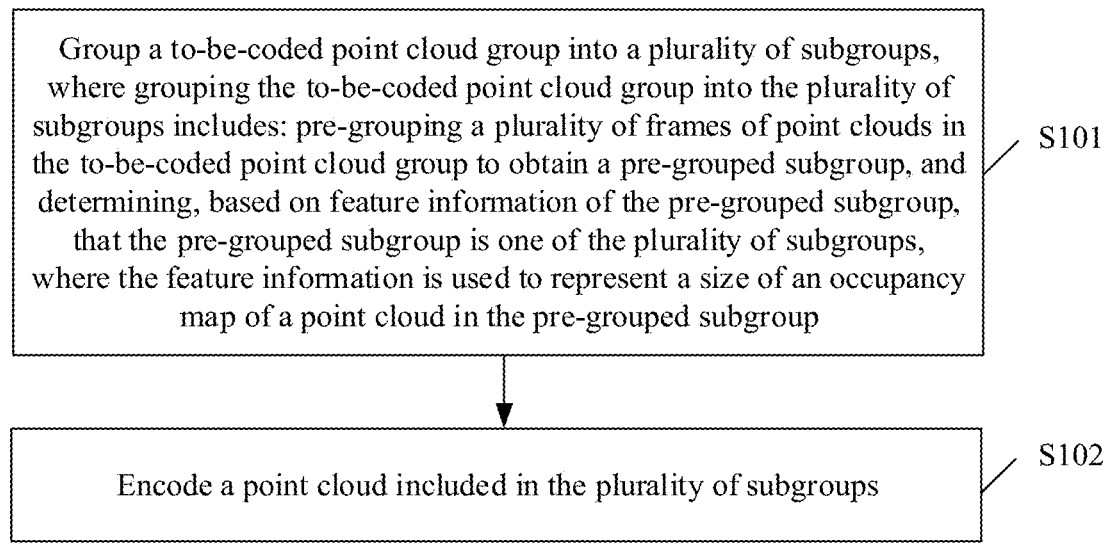
FIG. 5 is a schematic flowchart of a point cloud encoding method according to an embodiment of this application.

FIG. 5 is a schematic flowchart of a point cloud encoding method according to an embodiment of this application. The method may include the following steps.

S101: Group a to-be-coded point cloud group into a plurality of subgroups, where grouping the to-be-coded point cloud group into the plurality of subgroups includes pre-grouping a plurality of frames of point clouds in the to-be-coded point cloud group to obtain a pre-grouped subgroup, and determining, based on feature information of the pre-grouped subgroup, that the pre-grouped subgroup is one of the plurality of subgroups, where the feature information is used to represent a size of an occupancy map of a point cloud in the pre-grouped subgroup.

Size information of the occupancy map of the point cloud may be an area, a height, a width, or the like of the occupancy map of the point cloud. An example in which the size information of the occupancy map of the point cloud is the area of the occupancy map is used for description below. A general description is provided herein, and details are not described below.

The to-be-coded point cloud group includes a plurality of frames of point clouds, and the plurality of frames of point clouds may be temporally consecutive or non-consecutive. For example, the to-be-coded point cloud group may be one or more groups of frames (GOFs), and one GOF may include 32 frames of point clouds. Certainly, this is not limited thereto.

Any subgroup obtained by grouping to-be-coded point clouds may include one or more frames of point clouds. Quantities of frames of point clouds included in different subgroups may be equal or may not be equal.

A method used for pre-grouping is not limited in this embodiment of this application. For example, the plurality of frames of point clouds in the to-be-coded point cloud group may be pre-grouped by using a window sliding method or a dichotomy.

The size of the occupancy map of the point cloud in the pre-grouped subgroup may be determined based on a global matching packing algorithm or another packing algorithm, for example, an anchor packing algorithm.

The feature information of the pre-grouped subgroup may be information directly or indirectly used to represent the size of the occupancy map of the point cloud in the pre-grouped subgroup. For example, the feature information may include at least one of the following information 1 to information 3.

The information 1 is a size of a global occupancy map of the pre-grouped subgroup. Optionally, the size of the global occupancy map of the pre-grouped subgroup may be represented by a product of a height and a width of the global occupancy map (that is, an area of the global occupancy map) of the pre-grouped subgroup. Optionally, in a subgroup determining process, if widths of obtained global occupancy maps of different pre-grouped subgroups are the same, a size of a global occupancy map of a pre-grouped subgroup may be represented by a height of the global occupancy map of the pre-grouped subgroup. Similarly, in a subgroup determining process, if heights of obtained global occupancy maps of different pre-grouped subgroups are the same, a size of a global occupancy map of a pre-grouped subgroup may be represented by a width of the global occupancy map of the pre-grouped subgroup. Because the size of the global occupancy map of the pre-grouped subgroup defines a minimum size of an occupancy map of each frame of point cloud in the pre-grouped subgroup, the size of the occupancy map of the point cloud in the pre-grouped subgroup may be indirectly represented by using the size of the global occupancy map of the pre-grouped subgroup.

The information 2 is the size of the occupancy map of the point cloud in the pre-grouped subgroup, for example, sizes of occupancy maps of one or more frames (for example, all frames) of point clouds in the pre-grouped subgroup. Optionally, the size of the occupancy map of the point cloud in the pre-grouped subgroup may be represented by a product of a height and a width of the occupancy map (that is, an area of the occupancy map) of the point cloud in the pre-grouped subgroup. Optionally, in a subgroup determining process, if widths of obtained occupancy maps of different point clouds are the same, a size of an occupancy map of a point cloud in a pre-grouped subgroup may be represented by a height of the occupancy map of the point cloud in the pre-grouped subgroup. Similarly, in a subgroup determining process, if heights of obtained occupancy maps of different point clouds are the same, a size of an occupancy map of a point cloud in a pre-grouped subgroup may be represented by a width of the occupancy map of the point cloud in the pre-grouped subgroup. The information 2 is information directly used to represent the size of the occupancy map of the point cloud in the pre-grouped subgroup.

The information 3 is an area of a union patch occupancy map of the pre-grouped subgroup. It can be learned from the foregoing description that there may be a plurality of union patch occupancy maps of the pre-grouped subgroup. The area of the union patch occupancy map of the pre-grouped subgroup may be areas of one or more (for example, all) union patch occupancy maps of the pre-grouped subgroup. Because the area (for example, a total area) of the union patch occupancy map of the pre-grouped subgroup may reflect the area of the occupancy map of the point cloud in the pre-grouped subgroup to some extent, the size of the occupancy map of the point cloud in the pre-grouped subgroup may be indirectly represented by the area (for example, the total area) of the union patch occupancy map of the pre-grouped subgroup.

S102: Encode a point cloud included in the plurality of subgroups. Details are as follows.

In some implementations, point clouds included in the plurality of subgroups are separately packed by using the grouped subgroup as a unit, to obtain an occupancy map of each point cloud in the to-be-coded point cloud group. Then, the occupancy map of each point cloud is filled to perform video encoding. Alternatively, a depth map of the point cloud, a texture map of the point cloud, and the like are generated by using the occupancy map of the point cloud as a guide. For a specific process, refer to the foregoing description of a working principle of the encoder 100 shown in FIG. 2 or refer to the conventional technology. Details are not described herein again.

Generally, point clouds in one subgroup are packed by using a same packing algorithm. Packing algorithms used to pack point clouds in different subgroups may be the same or different. This is not limited in this embodiment of this application. Optionally, if the feature information of the pre-grouped subgroup is obtained based on a global matching packing algorithm, and one subgroup includes a plurality of frames of point clouds, the point clouds in the subgroup may be packed based on the global matching packing algorithm.

It should be noted that, if occupancy maps of point clouds in one or some subgroups are obtained in a process of grouping the to-be-coded point cloud group, when S102 is performed, the packing step may not be performed on the point clouds in the subgroup or subgroups.

In the point cloud encoding method provided in this embodiment of this application, to-be-coded point clouds are grouped with reference to the feature information of the pre-grouped subgroup, and the feature information is used to represent the size of the occupancy map of the point cloud in the pre-grouped subgroup. A size of an occupancy map of a point cloud determines a size of a depth map and a size of a texture map of the point cloud, and the sizes of the occupancy map, the depth map, and the texture map of the point cloud are key factors that affect video coding efficiency in a point cloud encoding process. Therefore, the subgroups into which the to-be-coded point cloud group is grouped are determined with reference to the size of the occupancy map of the point cloud in the pre-grouped subgroup. This helps improve video encoding efficiency, thereby improving point cloud coding efficiency.

Optionally, S101 may include the following steps S101-1 to S101-2.

S101-1: Pre-group, for an $i^{th}$ time by using a $j^{th}$ frame of point cloud as a start point, point clouds that are not grouped in the to-be-coded point cloud group, to obtain an $i^{th}$ pre-grouped subgroup, where the $j^{th}$ frame of point cloud is a first frame of point cloud in the point clouds that are not grouped, $i \geq 1$, and i is an integer, $j \geq 1$, and j is an integer, and the $i^{th}$ pre-grouped subgroup includes one or more frames of point clouds starting from the $j^{th}$ frame of point cloud.

S101-2: Determine that the $i^{th}$ pre-grouped subgroup is a subgroup based on feature information of the $i^{th}$ pre-grouped subgroup.

It can be learned from this optional manner that in this embodiment of this application, a technical solution of determining a next subgroup based on an order of the point clouds in the to-be-coded point cloud group when a subgroup included in the to-be-coded point cloud group is determined is supported. In a subgroup determining process, pre-grouping usually needs to be performed one or more times (for example, sliding a window one or more times, or performing a dichotomy one or more times), and one pre-grouped subgroup may be determined each time pre-grouping is performed.

S101-1 is a specific implementation of "pre-grouping a plurality of frames of point clouds in the to-be-coded point cloud group to obtain a pre-grouped subgroup" in S101. S101-2 is a specific implementation of "determining, based on feature information of the pre-grouped subgroup, that the pre-grouped subgroup is one of the plurality of subgroups" in S101.

The following briefly describes some terms in a process of implementing pre-grouping by sliding a window, to facilitate understanding of a reader.

Sliding the window once can circle one or more frames of point clouds. In this embodiment of this application, descriptions are all provided by using an example in which "in a subgroup determining process, when i=1, a quantity of frames of point clouds circled by sliding a window for an $i^{th}$ time is equal to a step size used to slide the window for the $i^{th}$ time plus 1, or when $i \geq 2$, a quantity of frames of point clouds circled by sliding the window for an $i^{th}$ time is equal to a step size used to slide the window for the $i^{th}$ time". In this embodiment of this application, a case in which "when $i \geq 1$, a quantity of frames of point clouds circled by sliding a window for an $i^{th}$ time is equal to a step size used to slide the window for the $i^{th}$ time" is not excluded. In this case, a person of ordinary skill in the art may reasonably infer, based on the following descriptions of terms and without creative effort, to obtain corresponding terms applicable to this case.

Step sizes used to slide the window for different times may be equal or unequal.

Sliding the window for the $i^{th}$ time is a process of sliding i step sizes from the first frame of point cloud in the point clouds that are not grouped in the to-be-coded point cloud group, where a $t^{th}$ step size in the i step sizes is a step size used to slide the window for a $t^{th}$ time, $1 \leq t \leq i$, and t is an integer. It may be understood that, generally, when $i \geq 2$, sliding the window for the $i^{th}$ time may be considered as sliding one step size starting from a last frame of circled point cloud in the to-be-coded point cloud group, and the step size is the step size used to slide the window for the $i^{th}$ time.

The $i^{th}$ pre-grouped subgroup is a set including point clouds circled by sliding the window for a first time to the $i^{th}$ time. Generally, a quantity of frames of point clouds included in the $i^{th}$ pre-grouped subgroup is equal to a sum of step sizes used to slide the window for the first time to the $i^{th}$ time plus 1.

Figure 6:
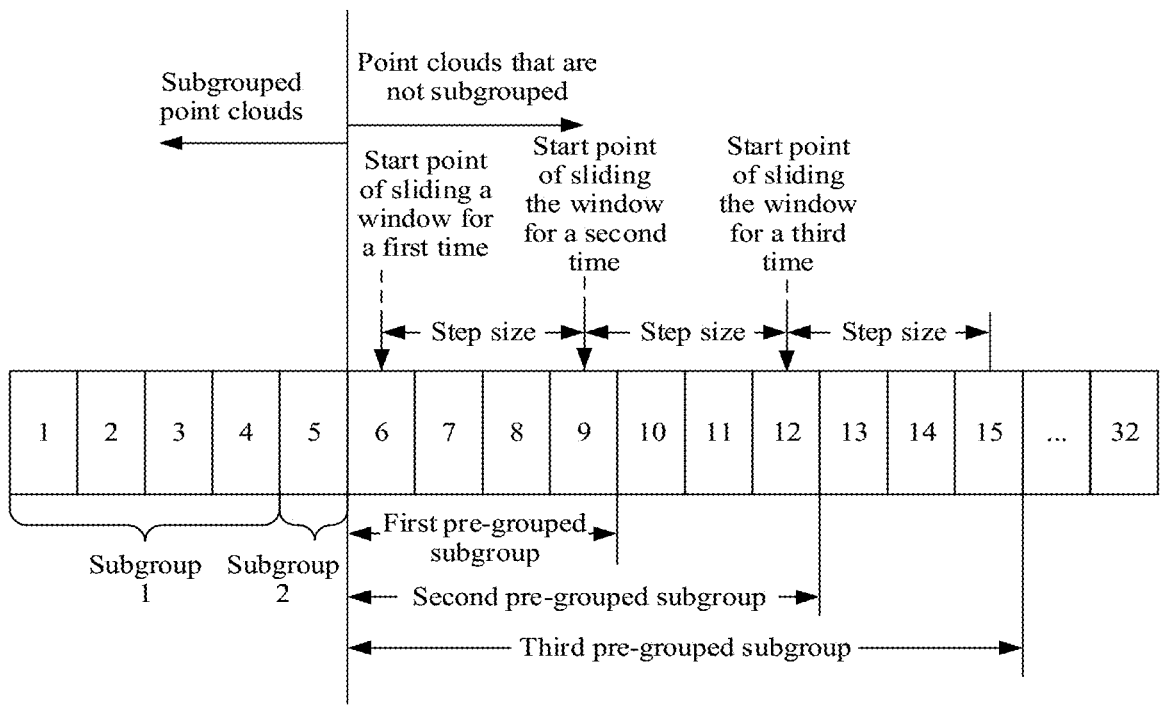
FIG. 6 is a schematic diagram of a correspondence between a sliding window, a step size, and a pre-grouped subgroup according to an embodiment of this application.

FIG. 6 is a schematic diagram of a correspondence between a sliding window, a step size, and a pre-grouped subgroup according to an embodiment of this application. In FIG. 6, the to-be-coded point cloud group includes point clouds 1 to 32. A rectangular box in FIG. 6 represents a frame of point cloud, and a digit in the rectangular box represents a number of the point cloud. A step size used to slide a window each time is 3. In other words, three frames of point clouds can be circled by sliding the window once. In addition, grouped subgroups are a subgroup 1 and a subgroup 2, the subgroup 1 is a set including the point clouds 1 to 4, and the subgroup 2 is a set including the point cloud 5. Based on this, in a process of determining a subgroup 3, point clouds circled after the window is slid for a first time by using the point cloud 6 as a start point are the point clouds 6 to 9. In this case, an obtained first pre-grouped subgroup is a set including the point clouds 6 to 9. Sliding the window for a second time by using the point cloud 6 as a start point is to slide one step size from a last frame of point cloud (that is, the point cloud 9) circled by slide the window for the first time. Therefore, point clouds circled after the window is slid for the second time are the point clouds 10 to 12. In this case, an obtained second pre-grouped subgroup is a set including the point clouds 6 to 12.

In different subgroup determining processes, an initial value of i is always 1. Unless otherwise described, sliding the window for the $i^{th}$ time described in this embodiment of this application is to slide a window for an $i^{th}$ time in a subgroup determining process. Similarly, the $i^{th}$ pre-grouped subgroup is an $i^{th}$ pre-grouped subgroup in the subgroup determining process. A general description is provided herein, and details are not described below.

The following uses specific examples to describe a method, for determining a subgroup in the to-be-coded point cloud group when pre-grouping is implemented by using a window sliding method, that is provided in this embodiment of this application. For details, refer to the following Embodiment 1 or Embodiment 2.

Embodiment 1

Figure 7:
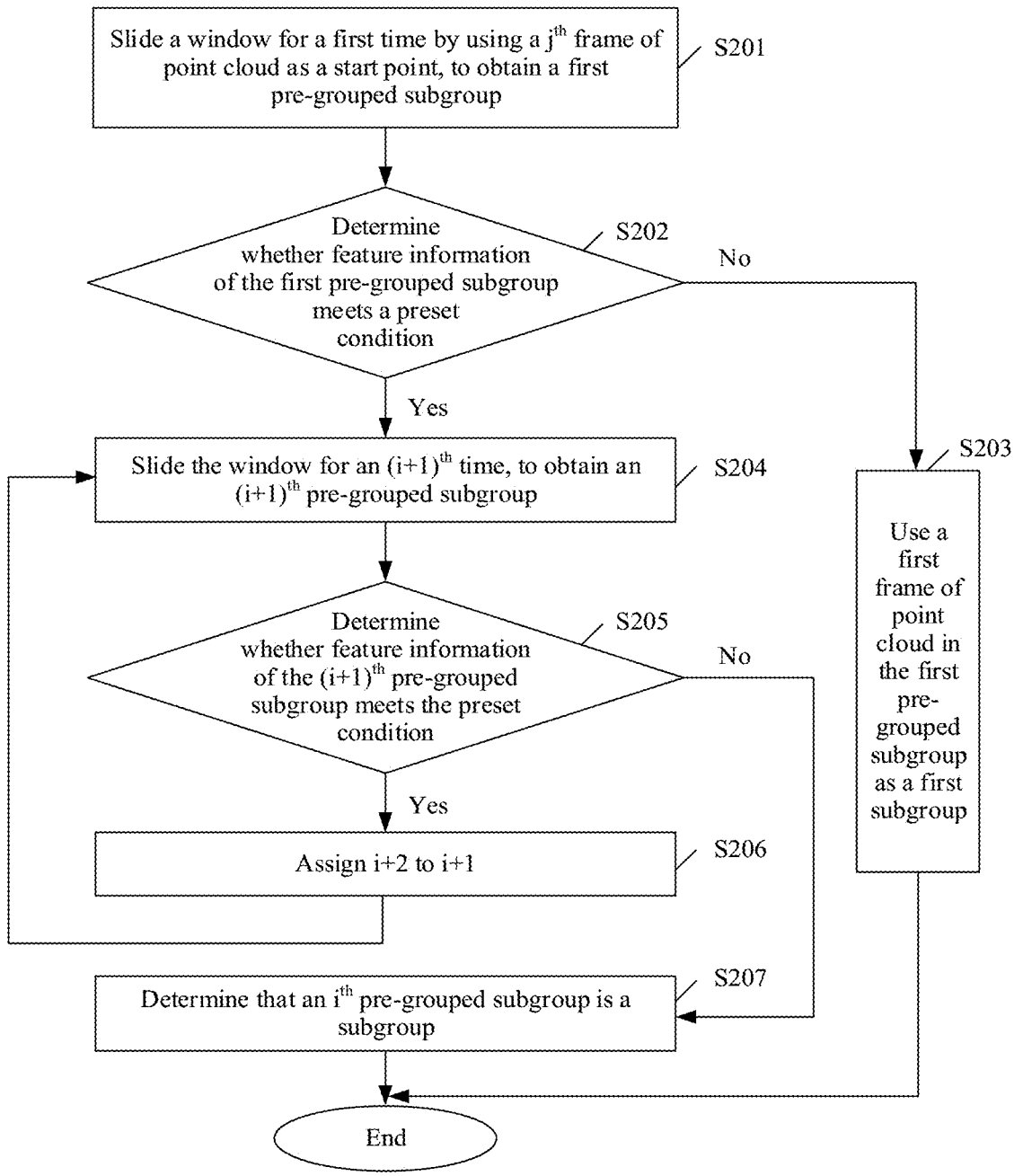
FIG. 7 is a schematic flowchart of a subgroup determining method according to an embodiment of this application.

FIG. 7 is a schematic flowchart of a subgroup determining method according to an embodiment of this application. The method shown in FIG. 7 includes the following steps.

S201: Slide the window for the first time by using the $j^{th}$ frame of point cloud as a start point, to obtain the first pre-grouped subgroup, where a set including point clouds circled by sliding the window for the first time is used as the first pre-grouped group, and the $j^{th}$ frame of point cloud is the first frame of point cloud in the point clouds that are not grouped in the to-be-coded point cloud group.

$1 \leq j \leq J$, and J is a quantity of frames of point clouds included in the to-be-coded point cloud group. When the method shown in FIG. 7 is used to determine a first subgroup of to-be-coded point clouds, j is equal to 1. When the method shown in FIG. 7 is used to determine a second subgroup of to-be-coded point clouds or any subgroup after the second subgroup, j is equal to a sum of quantities of frames of point clouds included in the first to the $(i-1)^{th}$ subgroups plus 1.

S202: Determine whether feature information of the first pre-grouped subgroup meets a preset condition.

If the feature information of the first pre-grouped subgroup does not meet the preset condition, S203 is performed. If the feature information of the first pre-grouped subgroup meets the preset condition, S204 is performed.

S203: Use a first frame of point cloud in the first pre-grouped subgroup as the first subgroup.

After S203 is performed, the process ends.

For example, referring to FIG. 6, it can be learned from the subgroup 2 being a set including one frame of point cloud that in a process of determining the subgroup 2, the obtained first pre-grouped subgroup (that is, a set including the point clouds 5 to 8) does not meet the preset condition.

S204: Slide the window for an $(i+1)^{th}$ time, to obtain an $(i+1)^{th}$ pre-grouped subgroup, where a set including point clouds circled by sliding the window for the first time to the $(i+1)^{th}$ time is used as the $(i+1)^{th}$ pre-grouped group.

$i \geq 1$ and i is an integer. An initial value of i is 1.

S205: Determine whether feature information of the $(i+1)^{th}$ pre-grouped subgroup meets the preset condition.

If the feature information of the $(i+1)^{th}$ pre-grouped subgroup meets the preset condition, S206 is performed. If the feature information of the $(i+1)^{th}$ pre-grouped subgroup does not meet the preset condition, S207 is performed.

S206: Assign i+2 to i+1. After S206 is performed, S204 is returned to be performed.

S207: Determine that the $i^{th}$ pre-grouped subgroup is a subgroup.

It should be noted that S204 in this embodiment may be replaced by sliding the window for the $i^{th}$ time, to obtain the $i^{th}$ pre-grouped subgroup. $i \geq 2$ and i is an integer. An initial value of i is 2. In this case, S205 may be replaced by determining whether the feature information of the $i^{th}$ pre-grouped subgroup meets the preset condition, S206 may be replaced by assigning i+1 to i, and S207 may be replaced by determining that an $(i-1)^{th}$ pre-grouped subgroup is a subgroup.

For example, referring to FIG. 6, in the process of determining the subgroup 3, the $j^{th}$ frame of point cloud is the point cloud 6. If feature information of the second pre-grouped subgroup meets the preset condition, the window is slid for a third time to obtain a third pre-grouped subgroup. If feature information of the third pre-grouped subgroup does not meet the preset condition, the second pre-grouped subgroup (that is, the set including the point clouds 6 to 12) is used as the subgroup 3.

For another example, referring to FIG. 6, it is assumed that a step size used to slide the window each time is 3. In this case, it can be learned from the subgroup 1 being a set including four frames of point clouds that, in a process of determining the subgroup 1, the obtained first pre-grouped subgroup (that is, a set including the point clouds 1 to 4) meets the preset condition, and the obtained second pre-grouped subgroup (that is, a set including the point clouds 1 to 7) does not meet the preset condition.

In Embodiment 1, step sizes used to slide the window for different times may be equal or unequal.

Optionally, a step size used to slide the window for an $i_1^{th}$ time is greater than or equal to a step size used to slide the window for an $i_2^{th}$ time, where $1 \leq i_1 < i_2 \leq i$, and both $i_1$ and $i_2$ are integers. In other words, in this embodiment of this application, a technical solution in which, in a subgroup determining process, a step size used to slide the window later is greater than or equal to a step size used to slide the window earlier is supported. Details are as follows.

In some implementations, a step size used to slide the window each time is the same. In other words, the window is slid at a fixed step size. Optionally, the fixed step size may be 1. In this case, when the to-be-coded point cloud group is grouped based on a point cloud as a granularity, a grouping result can be more precise. Optionally, the fixed step size may alternatively be a value greater than 1. Because a feature similarity of a plurality of consecutive frames of point clouds in a to-be-coded point cloud group, for example, in a GOF, is relatively high, a relatively large step size can reduce computing complexity in a grouping process.

In some other implementations, step sizes used to slide the window for at least two times are not equal, and a step size used to slide the window later is greater than or equal to a step size used to slide the window earlier. In other words, the window is slid at an unfixed step size. In this way, an appropriate step size is selected to help balance computation complexity and precision of a grouping result in a grouping process. This helps improve overall grouping performance, and further helps improve encoding performance. Optionally, a step size N[i+1] used to slide the window for the $(i+1)^{th}$ time is obtained according to a formula N[i+1]=N[i]×c. N[i] is the step size used to slide the window for the $i^{th}$ time, c is determined based on a quantity of frames of large-size point clouds in the $i^{th}$ pre-grouped subgroup. In other words, in a process of sliding a window twice consecutively, a step size used to slide the window earlier is used to determine a step size used to slide the window later. Further optionally, c=(a−b)/a, where a is a first preset quantity, and b is the quantity of frames of large-size point clouds in the $i^{th}$ pre-grouped subgroup. Certainly, this is not limited in this embodiment of this application.

It may be understood that, in a specific implementation, whether the step sizes used to slide the window for different times are fixed, a method for determining a step size when the step size is not fixed, and the like may be predefined.

S201 to S207 are performed for a plurality of times, to obtain the plurality of subgroups into which the to-be-coded point cloud group is grouped. S201 to S207 may be considered as a general method for determining a subgroup in a to-be-coded point cloud group. In an actual implementation, the following special cases may exist.

Case 1: It can be learned from the descriptions in S201 to S207 that when the feature information of the $i^{th}$ pre-grouped subgroup meets the condition, the window needs to be slid for the $(i+1)^{th}$ time. However, in this case, there may be a case in which no point cloud that is not circled remains in the to-be-coded point cloud group. In other words, a last frame of point cloud included in the $i^{th}$ pre-grouped subgroup is a last frame of point cloud in the to-be-coded point cloud group. In this case, it may be determined that the $i^{th}$ pre-grouped subgroup is a last subgroup of the to-be-coded point cloud group.

Figure 8A:
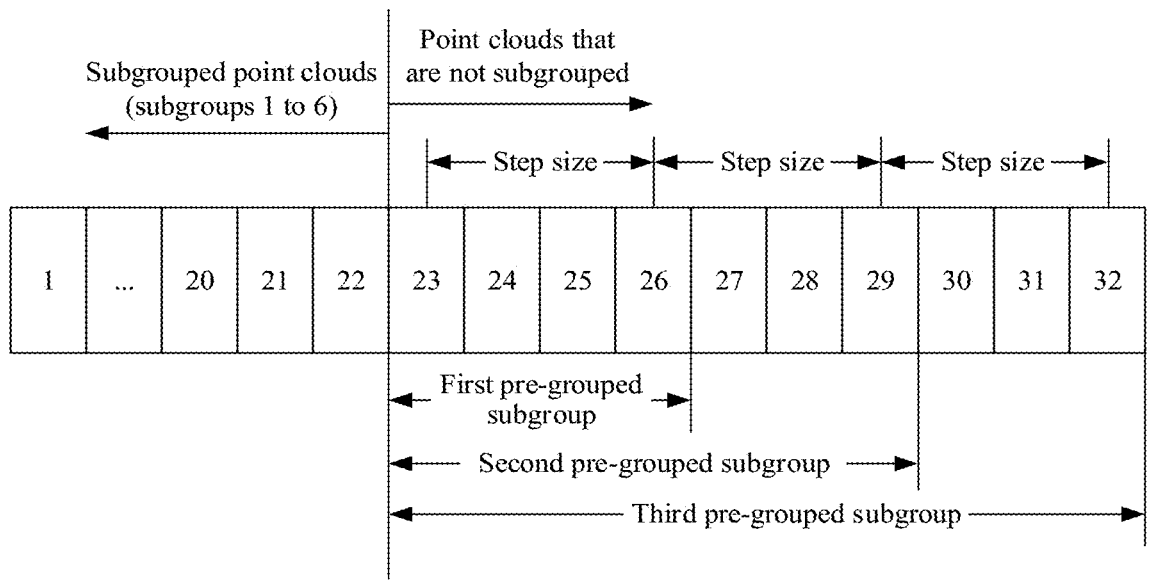
FIG. 8A is a schematic diagram of a subgroup determining process according to an embodiment of this application.

For example, referring to FIG. 8A, it is assumed that the to-be-coded point cloud group includes point clouds 1 to 32, and the grouped subgroups are subgroups 1 to 6. In this case, in a process of determining a subgroup 7, if the feature information of the third pre-grouped subgroup meets the preset condition, based on the descriptions in S201 to S207, a fourth pre-grouped subgroup needs to be obtained. In this case, because no point cloud that is not circled remains in the to-be-coded point cloud group, the third pre-grouped subgroup (that is, a set including the point clouds 23 to 32) may be used as the subgroup 7.

Case 2: In a process of sliding the window for the $(i+1)^{th}$ time, a step size used to slide the window for the $(i+1)^{th}$ time may be greater than a quantity of frames of point clouds that are not circled in the to-be-coded point cloud group. In this case, the point clouds included in the $i^{th}$ pre-grouped subgroup and the point clouds that are not circled in the to-be-coded point cloud group may be used as the $(i+1)^{th}$ ire-grouped subgroup.

Figure 8B:
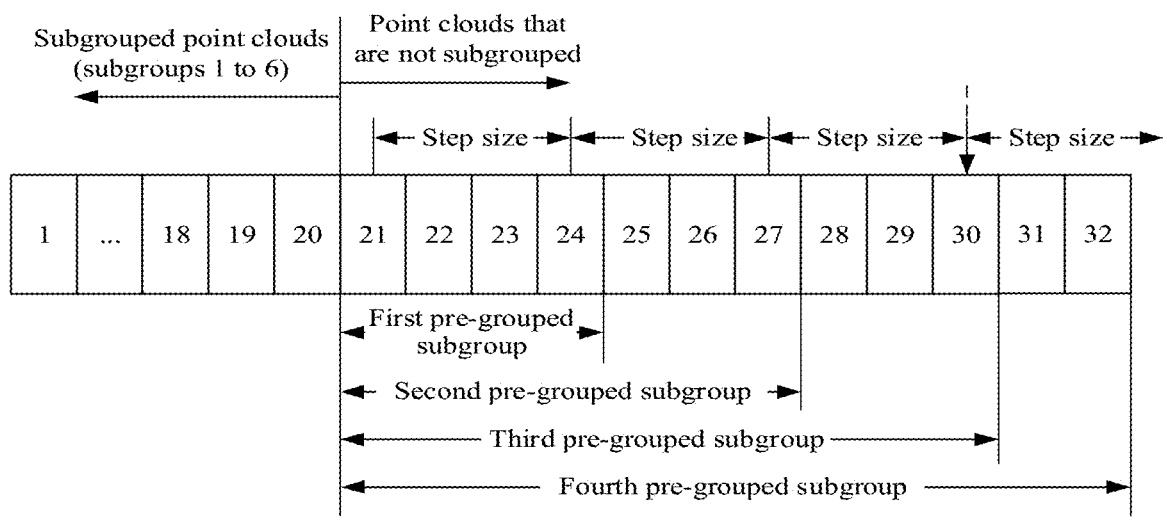
FIG. 8B is a schematic diagram of another subgroup determining process according to an embodiment of this application.

For example, referring to FIG. 8B, it is assumed that the to-be-coded point cloud group includes point clouds 1 to 32, and the grouped subgroups are subgroups 1 to 6. In this case, in a process of determining a subgroup 7, if the feature information of the third pre-grouped subgroup meets the preset condition, based on the descriptions in S201 to S207, a fourth pre-grouped subgroup needs to be obtained. In this case, because a step size (that is, 3) used to slide the window for a fourth time is greater than the quantity (that is, 2) of frames of point clouds (that is, the point clouds 31 to 32) that are not circled in the to-be-coded point cloud group, the point clouds 21 to 33 may be used as the fourth pre-grouped subgroup.

Embodiment 2

Figure 9A:
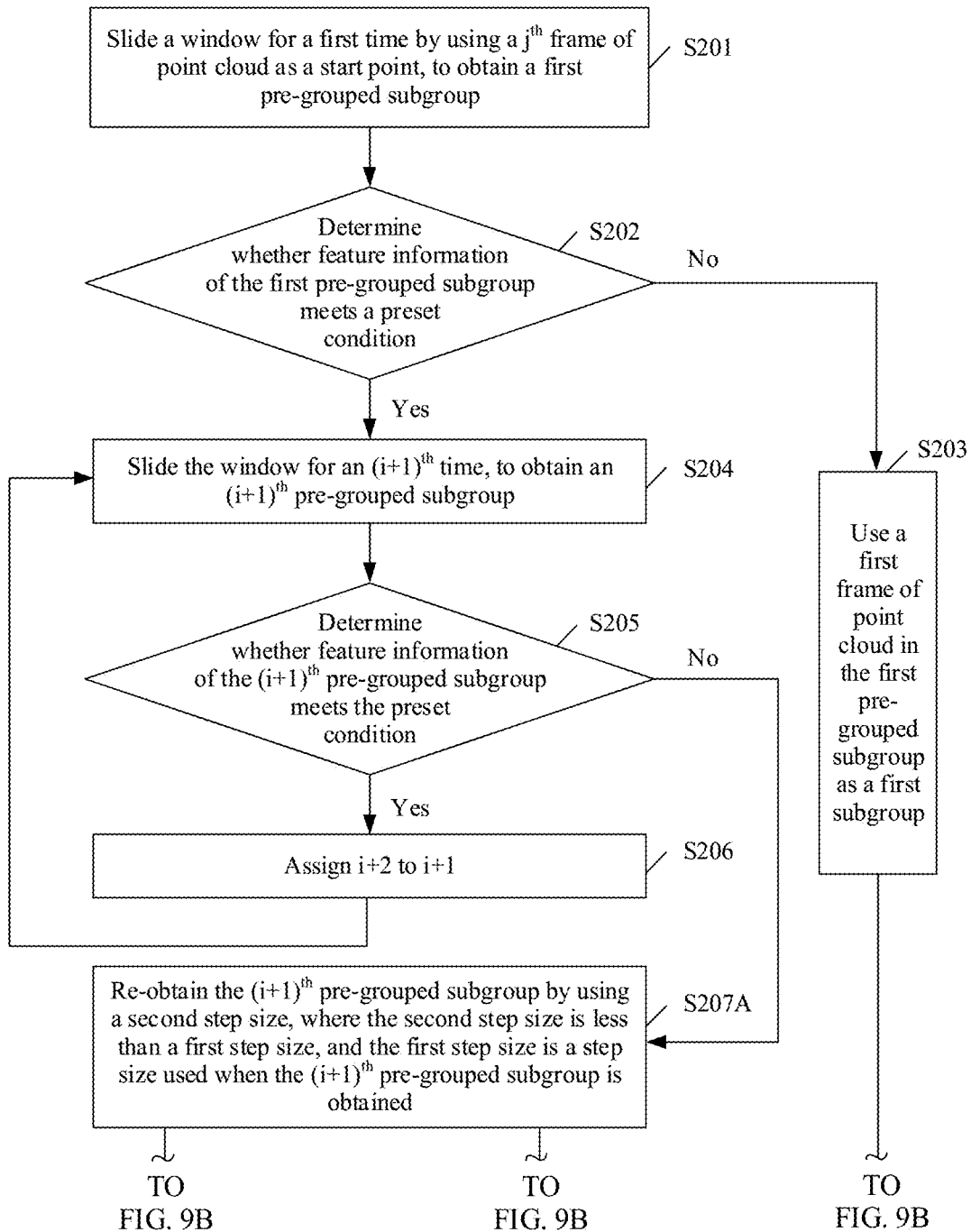
FIG. 9A and FIG. 9B are a schematic flowchart of another subgroup determining method according to an embodiment of this application.
Figure 9B:
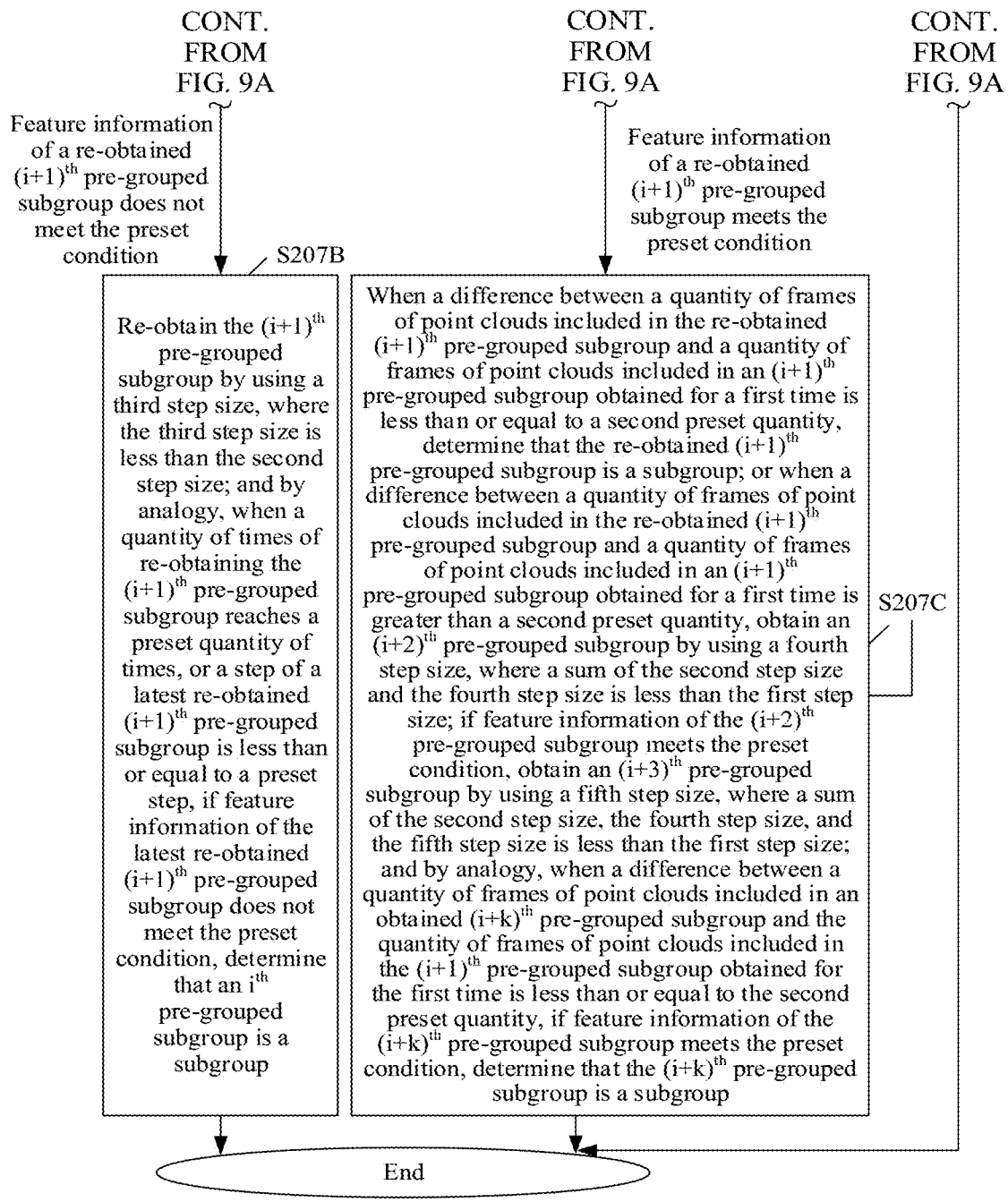

A difference between Embodiment 2 and Embodiment 1 lies in that, when i≥2, if the feature information of the $i^{th}$ pre-grouped subgroup meets the preset condition, and the feature information of the $(i+1)^{th}$ pre-grouped subgroup does not meet the preset condition, a smaller step size is used to re-obtain the $(i+1)^{th}$ pre-grouped group. This embodiment is applied to a scenario in which a step size used when the $(i+1)^{th}$ pre-grouped subgroup is obtained is greater than 1. A flowchart of the method provided in this embodiment may be shown in FIG. 9A and FIG. 9B. Further, S207 in Embodiment 1 may be replaced with the following steps S207A to S207C.

S207A: Re-obtain the $(i+1)^{th}$ pre-grouped subgroup by using a second step size, where the second step size is less than a first step size, and the first step size is the step size used when the $(i+1)^{th}$ pre-grouped subgroup is obtained.

A process of re-obtaining the $(i+1)^{th}$ pre-grouped subgroup may be understood as a process of returning (or rolling back) to a last frame of point cloud in the $i^{th}$ pre-grouped subgroup, and sliding the second step size by using the last frame as a start point.

S207B: If feature information of the $(i+1)^{th}$ pre-grouped subgroup re-obtained by using the second step size does not meet the preset condition, re-obtain the $(i+1)^{th}$ pre-grouped subgroup by using a third step size, where the third step size is less than the second step size, in other words, a step size of an $i^{th}$ pre-grouped subgroup re-obtained each time is less than a step size of an $i^{th}$ pre-grouped subgroup re-obtained at a previous time, and by analogy, when a quantity of times of re-obtaining the $(i+1)^{th}$ pre-grouped subgroup reaches a preset quantity of times, or a step size of a latest re-obtained $(i+1)^{th}$ pre-grouped subgroup is less than or equal to a preset step size (for example, 1), if feature information of the latest re-obtained $(i+1)^{th}$ pre-grouped subgroup does not meet the preset condition, it is determined that the $i^{th}$ pre-grouped subgroup is a subgroup.

Figure 10:
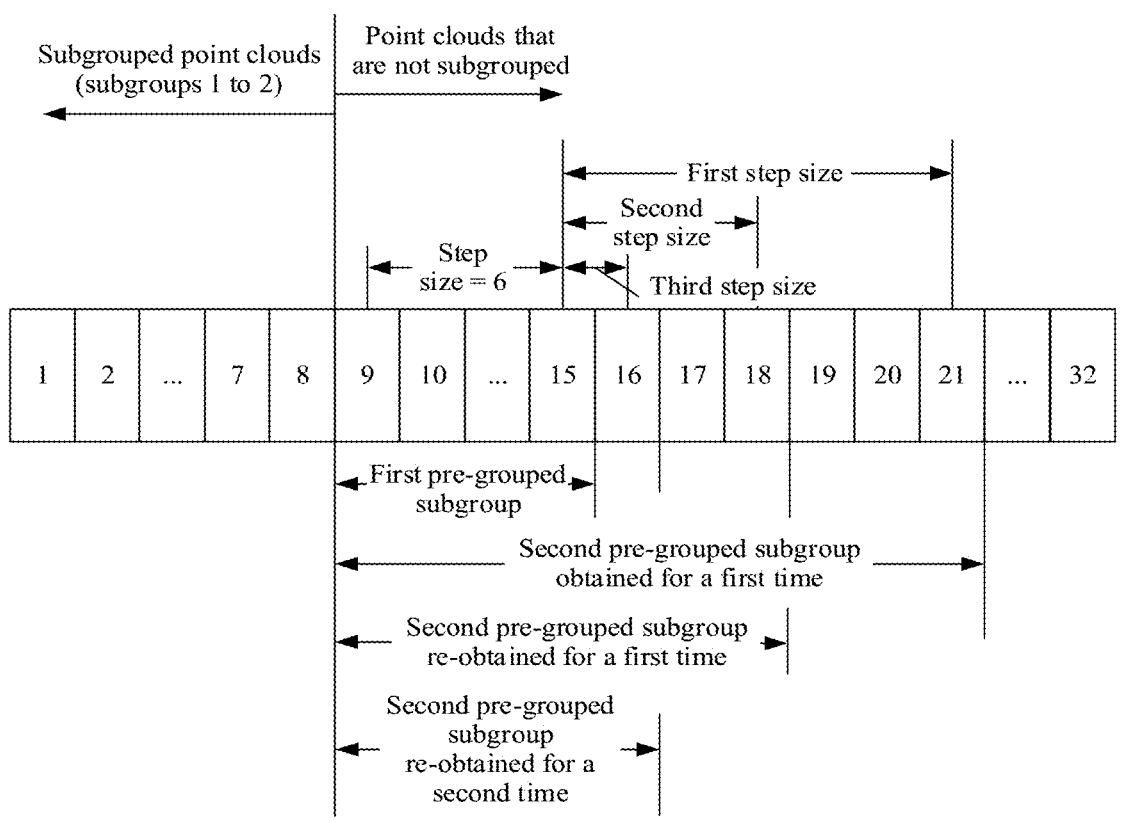
FIG. 10 is a schematic diagram of a process of a subgroup determining method based on FIG. 9A and FIG. 9B according to an embodiment of this application.

For example, referring to FIG. 10, it is assumed that in the process of determining the subgroup 3, feature information of the first pre-grouped subgroup (that is, a set including point clouds 9 to 15) meets the preset condition, feature information of the second pre-grouped subgroup (that is, a set including point clouds 9 to 21) does not meet the preset condition, and the first step size is 6. In this case, feature information of a pre-grouped subgroup including point clouds 9 to p may meet the condition, where 15<p<21, and p is an integer. Therefore, the second pre-grouped subgroup (that is, a set including the point clouds 9 to 18) is re-obtained by using the second step size (for example, 3). If feature information of a re-obtained second pre-grouped subgroup does not meet the preset condition, feature information of a subgroup including point clouds 9 to q may meet the preset condition, where 15<q<18, and q is an integer. Therefore, the second pre-grouped subgroup (that is, a set including the point clouds 9 to 16) is re-obtained by using the third step size (for example, 1). It is assumed that feature information of this re-obtained second pre-grouped subgroup does not meet the preset condition, and a quantity of times of re-obtaining the second pre-grouped subgroup reaches the preset quantity of times, or a step size of a latest re-obtained second pre-grouped subgroup is less than or equal to the preset step size. In this case, the first pre-grouped subgroup (that is, the set including the point clouds 9 to 15) is used as the subgroup 3.

It may be understood that if feature information of the $(i+1)^{th}$ pre-grouped subgroup re-obtained at a time meets the preset condition, the following step S207C may be performed.

S207C: If the feature information of the re-obtained $(i+1)^{th}$ pre-grouped subgroup meets the preset condition, when a difference between a quantity of frames of point clouds included in the re-obtained $(i+1)^{th}$ pre-grouped subgroup and a quantity of frames of point clouds included in the $(i+1)^{th}$ pre-grouped subgroup obtained for a first time is less than or equal to a second preset quantity, determine that the re-obtained $(i+1)^{th}$ pre-grouped subgroup is a subgroup.

Figure 11A:
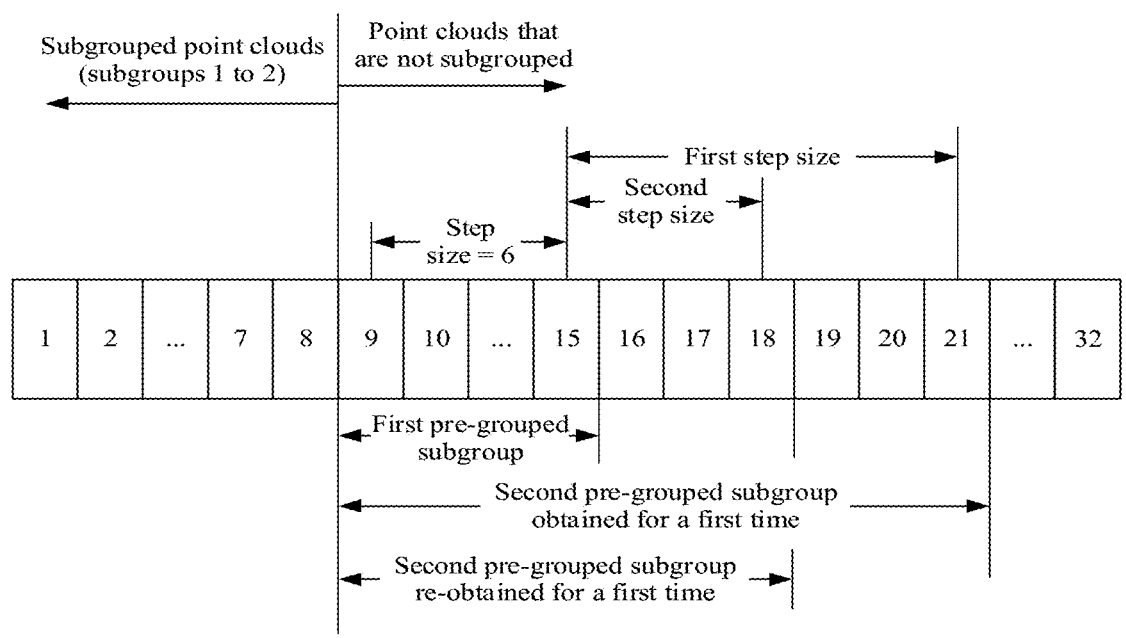
FIG. 11A is a schematic diagram of a process of a subgroup determining method based on FIG. 9A and FIG. 9B according to an embodiment of this application.

For example, referring to FIG. 11A, it is assumed that in the process of determining the subgroup 3, feature information of a re-obtained second pre-grouped subgroup (that is, a set including point clouds 9 to 18) meets the preset condition. In this case, feature information of a subgroup including point clouds 9 to d may meet the preset condition, where 18<d<21, and d is an integer. In this case, it is assumed that the second preset quantity is 3. Because a difference (that is, 3) between a quantity of frames of point clouds included in the re-obtained second pre-grouped subgroup and a quantity of frames of point clouds included in a second pre-grouped subgroup obtained for a first time is equal to the second preset quantity, the re-obtained second pre-grouped subgroup (that is, the set including the point clouds 9 to 18) is used as a subgroup.

When the difference between the quantity of frames of point clouds included in the re-obtained $(i+1)^{th}$ pre-grouped subgroup and the quantity of frames of point clouds included in the $(i+1)^{th}$ pre-grouped subgroup obtained for the first time is greater than the second preset quantity, an $(i+2)^{th}$ pre-grouped subgroup is obtained by using a fourth step size, where a sum of the second step size and the fourth step size is less than the first step size. If feature information of the $(i+2)^{th}$ pre-grouped subgroup meets the preset condition, an $(i+3)^{th}$ pre-grouped subgroup is obtained by using a fifth step size, where a sum of the second step size, the fourth step size, and the fifth step size is less than the first step size. In other words, a sum of a step size used to obtain an $(i+k)^{th}$ pre-grouped subgroup, a step size used to obtain an $(i+k-1)^{th}$ pre-grouped subgroup, a step size used to obtain an $(i+k-2)^{th}$ pre-grouped subgroup, ..., the step size used to obtain the $(i+2)^{th}$ pre-grouped subgroup, and the step size used to re-obtain the $(i+1)^{th}$ pre-grouped subgroup is less than a step size used to obtain the $(i+1)^{t}h$ pre-grouped subgroup for the first time. By analogy, when a difference between a quantity of frames of point clouds included in the obtained $(i+k)^{th}$ pre-grouped subgroup and the quantity of frames of point clouds included in the $(i+1)^{th}$ pre-grouped subgroup obtained for the first time is less than or equal to the second preset quantity, if feature information of the $(i+k)^{th}$ pre-grouped subgroup meets the preset condition, it is determined that the $(i+k)^{th}$ pre-grouped subgroup is a subgroup, where k≥2, and k is an integer.

Figure 11B:
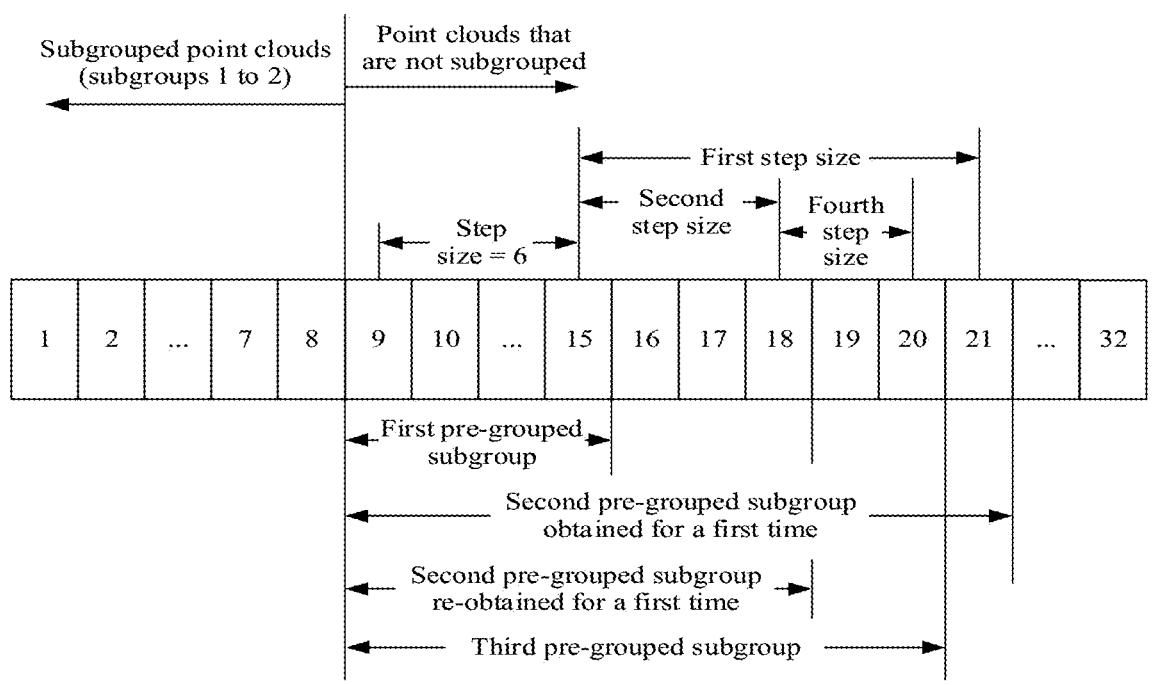
FIG. 11B is a schematic diagram of a process of another subgroup determining method based on FIG. 9A and FIG. 9B according to an embodiment of this application.

For example, referring to FIG. 11B, it is assumed that in the process of determining the subgroup 3, feature information of a re-obtained second pre-grouped subgroup (that is, a set including point clouds 9 to 18) meets the preset condition. In this case, feature information of a subgroup including point clouds 9 to d may meet the preset condition, where 18<d<21, and d is an integer. In this case, it is assumed that the second preset quantity is 1. Because a difference (that is, 1) between a quantity of frames of point clouds included in a third pre-grouped subgroup and the quantity of frames of point clouds included in the second pre-grouped subgroup obtained for the first time is equal to the second preset quantity, the third pre-grouped subgroup (that is, a set including point clouds 9 to 21) is used as a subgroup.

It may be understood that if the feature information of the $(i+k)^{th}$ pre-grouped subgroup does not meet the preset condition, the $(i+k)^{th}$ pre-grouped subgroup is re-obtained. For subsequent steps, refer to S207B and/or S207C.

It may be understood that, when no conflict occurs, explanations of related content in Embodiment 1 may also be applied to Embodiment 2. For example, the processing manners in Case 1 and Case 2 in Embodiment 1 may be applied to Embodiment 2. For another example, the step size determining method in Embodiment 1 may be applied to Embodiment 2.

The subgroup determining method provided in this embodiment helps to enable as many point clouds in the to-be-coded point cloud group as possible to form a subgroup that meets the preset condition when the step size of the sliding window is greater than 1. When one subgroup includes at least two frames of point clouds, occupancy maps that are of patches having a matching relationship in the point clouds and that are obtained by using the global matching packing algorithm correspond to locations in occupancy maps of point clouds in which the patches are located. This can improve encoding performance. Therefore, according to the solution provided in this embodiment, as many point clouds as possible form a subgroup that meets the preset condition, to improve encoding efficiency when the point clouds in the subgroup are packed by using the global matching packing algorithm.

The following briefly describes some terms in a process of implementing pre-grouping by using a dichotomy, to facilitate understanding of a reader A subgroup partition point refers to a partition point of two adjacent subgroups. It may be understood that an essence of grouping the to-be-coded point cloud group is to search for a subgroup partition point in the to-be-coded point cloud group.

A middle point of the dichotomy is a middle object in a plurality of objects in a sequence to which the dichotomy is targeted. For example, it is assumed that numbers of objects included in a sequence are respectively x to y, 1≤x<y, and both x and y are integers. In this case, a middle point of the dichotomy is an object numbered $\lfloor(y-x)/2\rfloor$ or an object numbered $\lceil(y-x)/2\rceil$. $\lfloor\ \rfloor$ indicates rounding down, and $\lceil\ \rceil$ indicates rounding up. Objects before a middle point in objects targeted by a current dichotomy are referred to as a first half of objects obtained by using the current dichotomy, and objects after the middle point are referred to as a second half of the objects obtained by using the current dichotomy.

The $i^{th}$ pre-grouped subgroup is obtained by performing, by using the $j^{th}$ frame of point cloud as a start point, the dichotomy for the $i^{th}$ time on the point clouds that are not grouped in the to-be-coded point cloud group. For example, a first half of point clouds obtained by using the dichotomy may be used as the $i^{th}$ pre-grouped subgroup. This is used as an example for description in this embodiment of this application. Certainly, this is not limited in this embodiment of this application. The $j^{th}$ frame of point cloud is the first frame of point cloud in the point clouds that are not grouped in the to-be-coded point cloud group.

If the feature information of the $i^{th}$ pre-grouped subgroup meets a preset condition, an $(i+1)^{th}$ pre-grouped subgroup is a set including the $i^{th}$ pre-grouped subgroup and a first half of point clouds obtained by performing the dichotomy for an $(i+1)^{th}$ time.

If the feature information of the $i^{th}$ pre-grouped subgroup does not meet the preset condition, the $(i+1)^{th}$ pre-grouped subgroup is a set including a first half of point clouds in the $i^{th}$ pre-grouped subgroup.

Figure 12A:
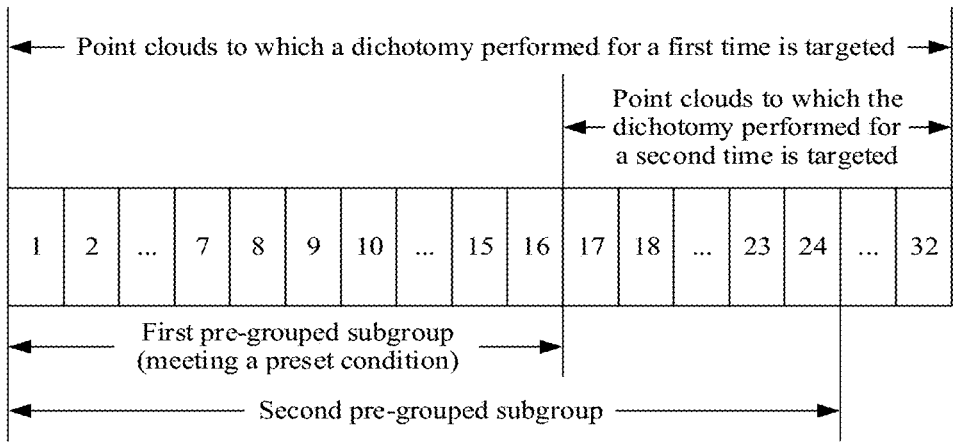
FIG. 12A and FIG. 12B are schematic diagrams of a relationship between a dichotomy and a pre-grouped subgroup according to an embodiment of this application.
Figure 12B:
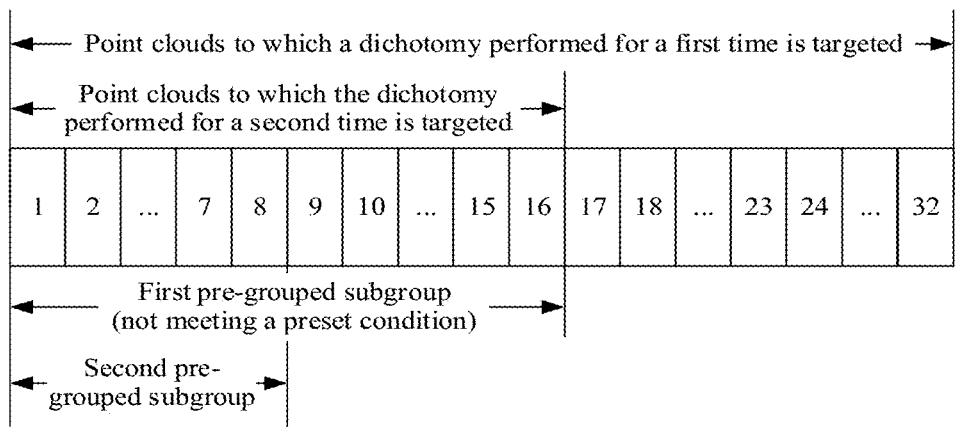

FIG. 12A and FIG. 12B are schematic diagrams of a relationship between a dichotomy and a pre-grouped subgroup according to an embodiment of this application. FIG. 12A and FIG. 12B are described by using an example in which the to-be-coded point cloud group includes point clouds 1 to 32. Further, the dichotomy is performed on the point clouds 1 to 32 to obtain the first pre-grouped subgroup (that is, a set including the point clouds 1 to 16). If feature information of the first pre-grouped subgroup meets the preset condition, the dichotomy is performed on the point clouds 16 to 32 to obtain the second pre-grouped subgroup (that is, a set including the point clouds 1 to 24), as shown in FIG. 12A. If feature information of the first pre-grouped subgroup does not meet the preset condition, the dichotomy is performed on the point clouds 1 to 16 to obtain the second pre-grouped subgroup (that is, a set including the point clouds 1 to 7), as shown in FIG. 12B.

The following uses specific examples to describe a method, for determining a subgroup in the to-be-coded point cloud group when pre-grouping is implemented by using the dichotomy, that is provided in this embodiment of this application. For details, refer to the following Embodiment 3 or Embodiment 4.

Embodiment 3

Figure 13:
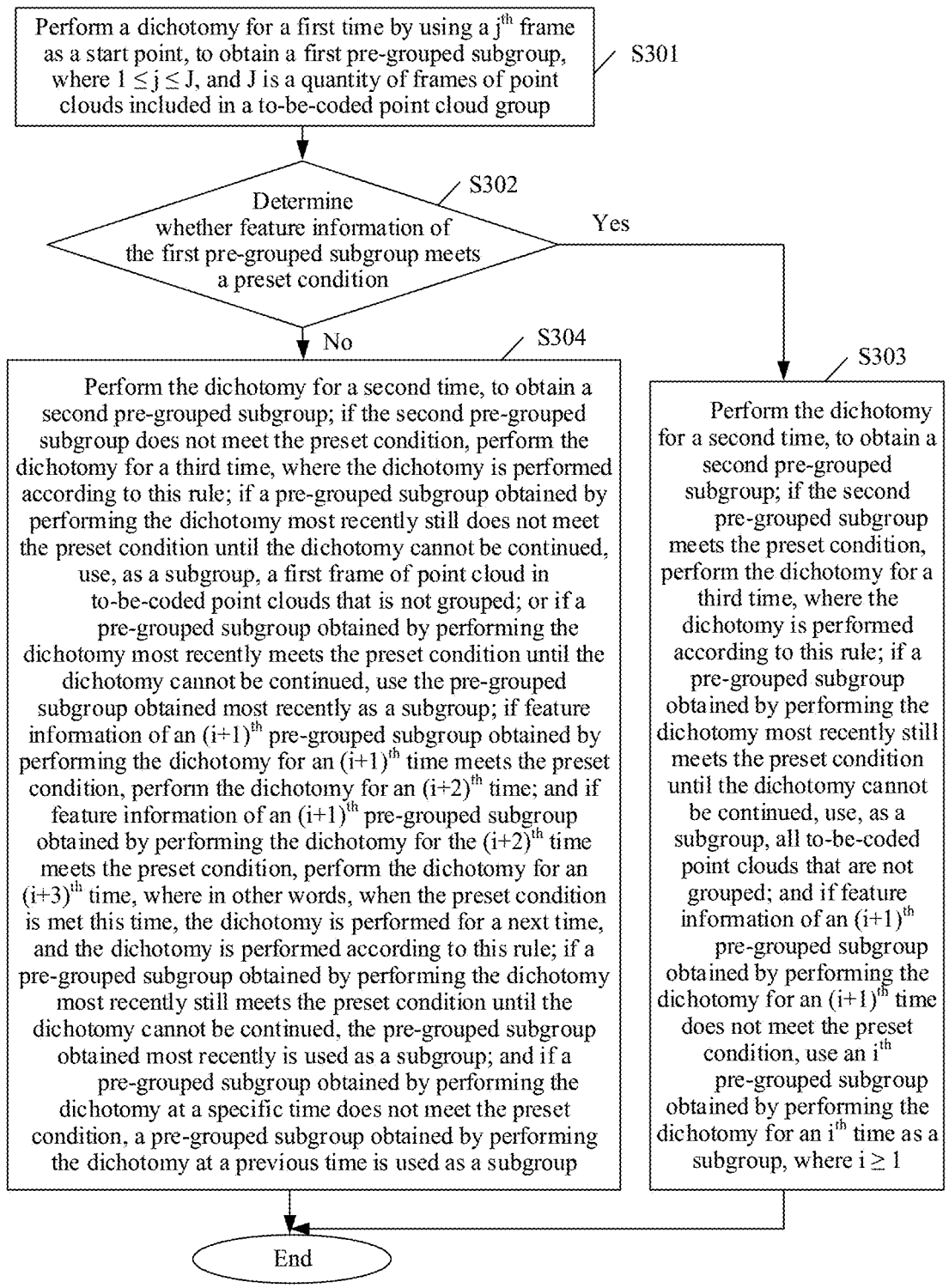
FIG. 13 is a schematic flowchart of another subgroup determining method according to an embodiment of this application.

FIG. 13 is a schematic flowchart of a subgroup determining method according to an embodiment of this application. The method shown in FIG. 13 includes the following steps.

S301: Perform a dichotomy for a first time by using the $j^{th}$ frame as a start point, to obtain the first pre-grouped subgroup, where $1 \leq j \leq J$, and J is a quantity of frames of point clouds included in the to-be-coded point cloud group.

S302: Determine whether the feature information of the first pre-grouped subgroup meets the preset condition.

If the feature information of the first pre-grouped subgroup meets the preset condition, it indicates that a to-be-determined partition point is in a second half of point clouds obtained by using the current dichotomy, and S303 is performed.

If the feature information of the first pre-grouped subgroup does not meet the preset condition, it indicates that a to-be-determined partition point is in a first half of point clouds obtained by using the current dichotomy, and S304 is performed.

S303: Perform the dichotomy for a second time, to obtain the second pre-grouped subgroup. If the second pre-grouped subgroup meets the preset condition, the dichotomy is performed for a third time. In other words, when a pre-grouped subgroup obtained by using the current dichotomy meets the preset condition, the dichotomy is performed for a next time. The dichotomy is performed according to this rule, and subsequent implementations may be as follows.

Implementation 1: If a pre-grouped subgroup obtained by performing the dichotomy most recently still meets the preset condition until the dichotomy cannot be continued, all to-be-coded point clouds that are not grouped are used as a subgroup.

Implementation 2: If feature information of the $(i+1)^{th}$ pre-grouped subgroup obtained by performing the dichotomy for the $(i+1)^{th}$ time does not meet the preset condition, the $i^{th}$ pre-grouped subgroup obtained by performing the dichotomy for the $i^{th}$ time is used as a subgroup, where $i \geq 1$ and i is an integer.

S304: Perform the dichotomy for a second time, to obtain the second pre-grouped subgroup. If the second pre-grouped subgroup does not meet the preset condition, the dichotomy is performed for a third time. In other words, when a pre-grouped subgroup obtained by using the current dichotomy does not meet the preset condition, the dichotomy is performed for a next time. The dichotomy is performed according to this rule, and subsequent implementations may be as follows.

Implementation 1: If a pre-grouped subgroup obtained by performing the dichotomy most recently still does not meet the preset condition until the dichotomy cannot be continued, a first frame of point cloud in to-be-coded point clouds that is not grouped is used as a subgroup.

Implementation 2: If a pre-grouped subgroup obtained by performing the dichotomy most recently meets the preset condition until the dichotomy cannot be continued, the pre-grouped subgroup obtained most recently is used as a subgroup.

Implementation 3: If feature information of the (i+1)th pre-grouped subgroup obtained by performing the dichotomy for the $(i+1)^{th}$ time meets the preset condition, the dichotomy is performed for an $(i+2)^{th}$ time and if feature information of an $(i+1)^{th}$ pre-grouped subgroup obtained by performing the dichotomy for the $(i+2)^{th}$ time meets the preset condition, the dichotomy is performed for an $(i+3)^{th}$ time. In other words, when the preset condition is met this time, the dichotomy is performed for a next time. The dichotomy is performed according to this rule. If a pre-grouped subgroup obtained by performing the dichotomy most recently still meets the preset condition until the dichotomy cannot be continued, the pre-grouped subgroup obtained most recently is used as a subgroup. If a pre-grouped subgroup obtained by performing the dichotomy at a time does not meet the preset condition, a pre-grouped subgroup obtained by performing the dichotomy at a previous time is used as a subgroup.

The subgroup determining method provided in this embodiment helps enable as many point clouds in the to-be-coded point cloud group as possible to form a subgroup that meets the preset condition. In this way, when the point clouds in the subgroup are packed by using the global matching packing algorithm, encoding efficiency is improved.

Embodiment 4

Figure 14:
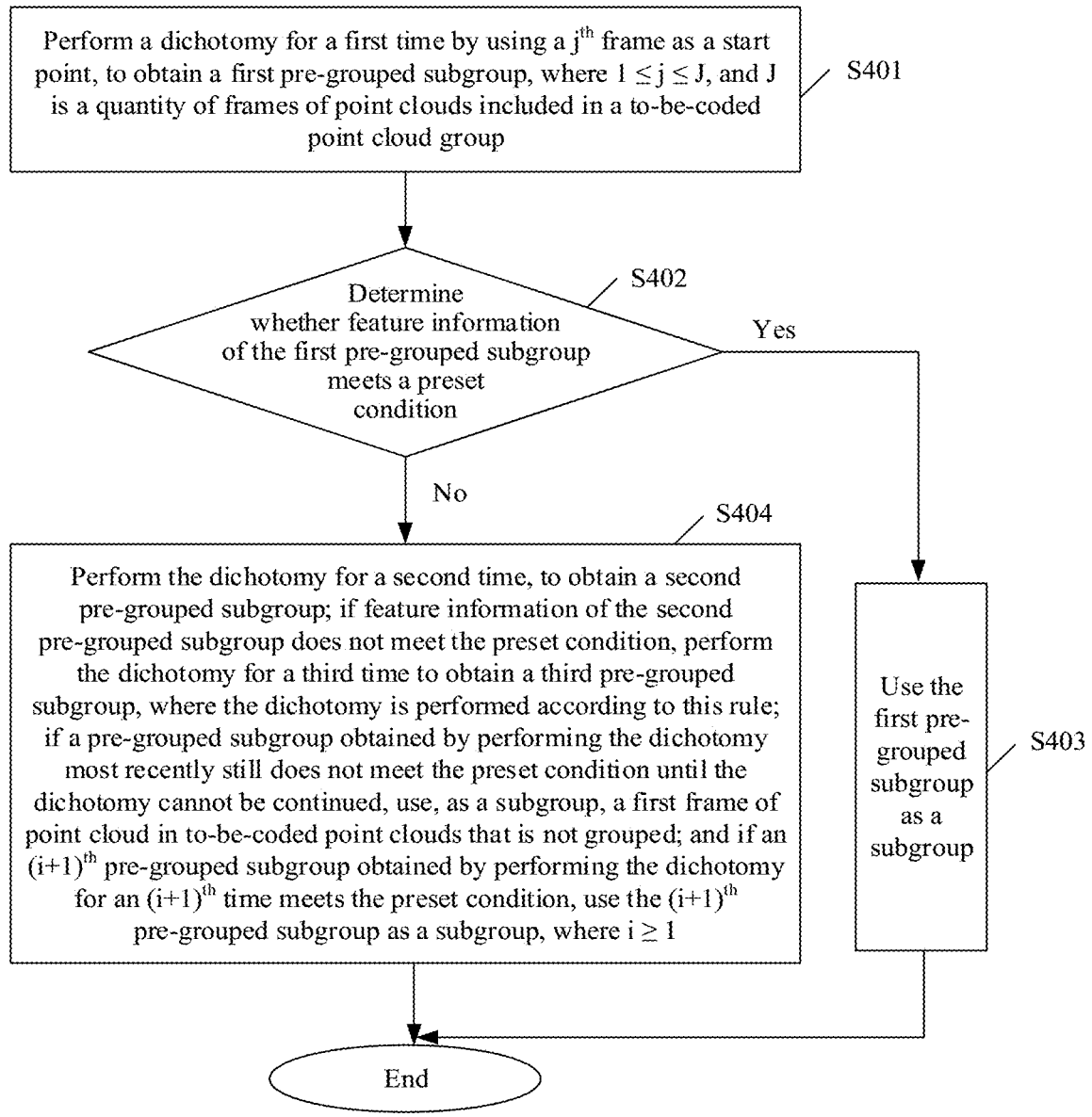
FIG. 14 is a schematic flowchart of another subgroup determining method according to an embodiment of this application.

FIG. 14 is a schematic flowchart of a subgroup determining method according to an embodiment of this application. The method shown in FIG. 14 includes the following steps.

S401: Perform a dichotomy for a first time by using the $j^{th}$ frame as a start point, to obtain the first pre-grouped subgroup, where $1 \leq j \leq J$, and J is a quantity of frames of point clouds included in the to-be-coded point cloud group.

S402: Determine whether the feature information of the first pre-grouped subgroup meets the preset condition.

If the feature information of the first pre-grouped subgroup meets the preset condition, S403 is performed. If the feature information of the first pre-grouped subgroup does not meet the preset condition, S404 is performed.

S403: Use the first pre-grouped subgroup as a subgroup.

S404: Perform the dichotomy for a second time, to obtain the second pre-grouped subgroup, and if feature information of the second pre-grouped subgroup does not meet the preset condition, perform the dichotomy for a third time to obtain a third pre-grouped subgroup, where in other words, when a pre-grouped subgroup obtained by using the current dichotomy does not meet the preset condition, the dichotomy is performed for a next time, the dichotomy is performed according to this rule, and subsequent implementations may be as follows.

Implementation 1: If a pre-grouped subgroup obtained by performing the dichotomy most recently still does not meet the preset condition until the dichotomy cannot be continued, a first frame of point cloud in to-be-coded point clouds that is not grouped is used as a subgroup.

Implementation 2: If the $(i+1)^{th}$ pre-grouped subgroup obtained by performing the dichotomy for the $(i+1)^{th}$ time meets the preset condition, the $(i+1)^{th}$ pre-grouped subgroup is used as a subgroup. $i \geq 1$ and i is an integer.

According to the subgroup determining method provided in this embodiment, a first pre-grouped subgroup, in a plurality of pre-grouped subgroups obtained by performing the dichotomy for a plurality of times, that meets the preset condition is used as a subgroup. Different from a pre-grouping method by using a window sliding method, if a pre-grouped subgroup obtained through pre-grouping by using the dichotomy meets the preset condition, it may be considered that the pre-grouped subgroup already includes a relatively large quantity of point clouds. Therefore, when the point clouds in the subgroup is packed by using the global matching packing algorithm, the encoding efficiency is improved.

It should be noted that, any kind of "the dichotomy cannot be continued" described in Embodiment 3 and Embodiment 4 may include, when a quantity of objects (point clouds) to which the dichotomy is targeted is 1, the dichotomy cannot be performed, or when a quantity of times of performing the dichotomy reaches a preset threshold, the dichotomy cannot be continued. That when a quantity of objects to which the dichotomy is targeted is 1, the dichotomy cannot be performed may be extended to, when the quantity of objects (point clouds) to which the dichotomy is targeted is less than or equal to a preset threshold, the dichotomy cannot be continued.

For whether any pre-grouped subgroup described in Embodiment 1 to Embodiment 4 meets the preset condition, refer to the following descriptions. An example in which it is determined that the $i^{th}$ pre-grouped subgroup is one of the plurality of subgroups when the feature information of the $i^{th}$ pre-grouped subgroup meets the preset condition and the feature information of the $(i+1)^{th}$ pre-grouped subgroup does not meet the preset condition is used for description below. In addition, it may be understood that a "pre-grouped subgroup" involved in the following description of whether the pre-grouped subgroup meets the preset condition may, for example, be obtained by using the window sliding method or the dichotomy.

Optionally, that it is determined that the $i^{th}$ pre-grouped subgroup is one of the plurality of subgroups when the feature information of the $i^{th}$ pre-grouped subgroup meets the preset condition and the feature information of the $(i+1)^{th}$ pre-grouped subgroup does not meet the preset condition may be implemented in at least one of the following manners.

Manner 1: If the feature information of the $i^{th}$ pre-grouped subgroup includes a size of a global occupancy map of the $i^{th}$ pre-grouped subgroup, when the size of the global occupancy map of the $i^{th}$ pre-grouped subgroup is less than or equal to a first threshold, and a size of a global occupancy map of the $(i+1)^{th}$ pre-grouped subgroup is greater than the first threshold, it is determined that the $i^{th}$ pre-grouped subgroup is a subgroup.

It is considered that a global occupancy map is obtained by packing one or more union patch occupancy maps, and the union patch occupancy map is a union of a group of global matched patches in a pre-grouped subgroup. Therefore, as a quantity of frames of point clouds in the pre-grouped subgroup increases, a quantity of patches in the group of global matching patches increases, an area of the union patch occupancy map corresponding to the group of global matched patches increases. Consequently, a size of the global occupancy map increases. Therefore, this approach is proposed. Based on this approach, a global occupancy map of a subgroup is limited within the first threshold. This may indirectly reflect a size of an occupancy map of a point cloud in the subgroup, thereby helping improve encoding efficiency.

It may be understood that when different parameters are used to represent the size of the global occupancy map, meanings of the first threshold are different. For example, when the size of the global occupancy map is represented by using a product of a height and a width of the global occupancy map, the first threshold represents a maximum allowable value of an area of a global occupancy map of a subgroup. For another example, when the size of the global occupancy map is represented by using a height of the global occupancy map, the first threshold represents a maximum allowable value of a height of a global occupancy map of a subgroup.

In an implementation, the first threshold is a predefined value, for example, a predefined empirical value. For example, when the first threshold represents the maximum allowable value of a height of a global occupancy map of a subgroup, the first threshold may be 1280 pixels.

In another implementation, the first threshold is determined based on a maximum size that is obtained based on a candidate packing algorithm and that is of an occupancy map of a point cloud (for example, each point cloud) in the to-be-coded point cloud group. The candidate packing algorithm may be another packing algorithm other than the global matching packing algorithm, for example, an anchor packing algorithm. For example, the first threshold is H×w1. H is a maximum value, obtained based on a candidate packing algorithm such as the anchor packing algorithm, of a height of the occupancy map of the point cloud in the to-be-coded point cloud group, and w1 is a constant. w1 may be determined based on impact of the global matching packing algorithm and the candidate packing algorithm on video coding efficiency. Optionally, $w1 \in (0.5, 1.5)$. Certainly, this is not limited thereto.

Manner 2: If the feature information of the $i^{th}$ pre-grouped subgroup includes a size of an occupancy map of a point cloud in the $i^{th}$ pre-grouped subgroup, the following Manner 2-1 and/or Manner 2-2 are performed.

Manner 2-1: When a quantity of frames of large-size point clouds in the $i^{th}$ pre-grouped subgroup is less than or equal to a first preset quantity, and a quantity of frames of large-size point clouds in the $(i+1)^{th}$ pre-grouped subgroup is greater than the first preset quantity, it is determined that the $i^{th}$ pre-grouped subgroup is a subgroup, where the large-size point cloud is a point cloud whose occupancy map size is greater than or equal to a second threshold. The occupancy map herein may be an occupancy map, of a frame of point cloud, that is obtained by packing the point cloud based on any packing algorithm.

The first preset quantity may be a predefined value, for example, a predefined empirical value, for example, 4. It may be understood that if the first preset quantity is 1, Manner 2-1 may be replaced as follows when the $i^{th}$ pre-grouped subgroup does not include a large-size point cloud, and the $(i+1)^{th}$ pre-grouped subgroup includes a large-size point cloud, it is determined that the $i^{th}$ pre-grouped subgroup is a subgroup.

It may be understood that when different parameters are used to represent the size of the occupancy map of the point cloud, meanings of the second threshold are different. For example, when the size of the occupancy map of the point cloud is represented by using a product of a height and a width of the occupancy map of the point cloud, the second threshold represents a maximum allowable value of an area of an occupancy map of a point cloud in a subgroup. For another example, when the size of the occupancy map of the point cloud is represented by using a height of the occupancy map of the point cloud, the second threshold represents a maximum allowable value of a height of an occupancy map of a point cloud in a subgroup.

In an implementation, the second threshold is a predefined value, for example, a predefined empirical value. For example, when the size of the occupancy map of the point cloud is represented by using the product of the height and the width of the occupancy map of the point cloud, the second threshold may be 1280 pixels.

In another implementation, the large-size point cloud is a point cloud whose occupancy map size obtained based on the global matching packing algorithm is greater than or equal to the second threshold.

In this case, optionally, the second threshold may be determined based on a maximum size that is obtained based on a candidate packing algorithm and that is of an occupancy map of the point cloud in the to-be-coded point cloud group. The candidate packing algorithm is another packing algorithm other than the global matching packing algorithm, for example, an anchor packing algorithm. For example, when $NH_{i,u} \geq H_{max} \times w2$, it is considered that a $u^{th}$ frame of point cloud in the $i^{th}$ pre-grouped subgroup is a large-size point cloud, where $u \geq 1$, and u is an integer. $NH_{i,u}$ is a height, obtained based on the global matching packing algorithm, of an occupancy map of the $u^{th}$ frame of point cloud in the $i^{th}$ pre-grouped subgroup, $H_{max}$ is a maximum value of a height, obtained based on the candidate packing algorithm such as the anchor packing algorithm, of the occupancy map of the point cloud in the to-be-coded point cloud group, and w2 is a constant. Optionally, $w2 \in (0.5, 1.5)$. Certainly, this is not limited thereto. Because a size of an occupancy map of a frame of point cloud is greater than or equal to a size of a global occupancy map of a subgroup in which the frame of point cloud is located, further optionally, w1<w2. For example, w1 is slightly less than w2.

Optionally, the second threshold may be determined based on a size that is obtained based on a candidate packing algorithm and that is of an occupancy map of a current point cloud. The candidate packing algorithm is another packing algorithm other than the global matching packing algorithm, for example, the anchor packing algorithm. For example, $NH_{i,u} \geq H_{i,u} \times w3$. $NH_{i,u}$ is a height, obtained based on the global matching packing algorithm, of an occupancy map of a $u^{th}$ frame of point cloud in the $i^{th}$ pre-grouped subgroup, is a height, obtained based on the candidate packing algorithm such as the anchor packing algorithm, of the occupancy map of the $u^{th}$ frame of point cloud in the $i^{th}$ pre-grouped subgroup, and w3 is a constant. Optionally, $w3 \in (0.5, 3.0)$. Further optionally, w3 is greater than w2.

Manner 2-2: When an average value of a ratio of a size that is obtained based on the global matching packing algorithm and that is of the occupancy map of the point cloud in the $i^{th}$ pre-grouped subgroup to a size that is obtained based on a candidate packing algorithm and that is of the occupancy map of the point cloud in the $i^{th}$ pre-grouped subgroup is less than or equal to a third threshold, and an average value of a ratio of a size that is obtained based on the global matching packing algorithm and that is of an occupancy map of a point cloud in the $(i+1)^{th}$ pre-grouped subgroup to a size that is obtained based on the candidate packing algorithm and that is of the occupancy map of the point cloud in the $(i+1)^{th}$ pre-grouped subgroup is greater than the third threshold, it is determined that the $i^{th}$ pre-grouped subgroup is a subgroup.

The candidate packing algorithm may be another packing algorithm other than the global matching packing algorithm, for example, an anchor packing algorithm. For example, $sum(NH_{i,u}/H_{i,u})/frameCnt_i \leq$ the third threshold, and $sum(NH_{i+1,v}/H_{i+1,v})/frameCnt_{i+1} >$ the third threshold. sum( ) indicates a summation operation. $NH_{i,u}$ is a height, obtained based on the global matching packing algorithm, of an occupancy map of a $u^{th}$ frame of point cloud in the $i^{th}$ pre-grouped subgroup, $H_{i,u}$ is a height, obtained based on the candidate packing algorithm, of the occupancy map of the $u^{th}$ frame of point cloud in the $i^{th}$ pre-grouped subgroup, $frameCnt_i$ is a quantity of frames of point clouds included in the $i^{th}$ pre-grouped subgroup, and $u \geq 1$, and u is an integer. $NH_{i+1,v}$ is a height, obtained based on the global matching packing algorithm, of an occupancy map of a $v^{th}$ frame of point cloud in the $(i+1)^{th}$ pre-grouped subgroup, $H_{i+1,v}$ is a height, obtained based on the candidate packing algorithm, of the occupancy map of the $v^{th}$ frame of point cloud in the $(i+1)^{th}$ pre-grouped subgroup, $frameCnt_{i+1}$ is a quantity of frames of point cloud included in the $(i+1)^{th}$ pre-grouped subgroup, and $v \geq 1$, and v is an integer.

Optionally, the third threshold is a predefined value. Optionally, the third threshold is a value greater than 1, for example, 1.2.

In addition, optionally, determining that the $i^{th}$ pre-grouped subgroup is a subgroup based on the feature information of the $i^{th}$ pre-grouped subgroup may include the following manner A or manner B.

Manner A: When a size of a global occupancy map of the $(i+1)^{th}$ pre-grouped subgroup is decreased by greater than or equal to a fifth threshold compared with the size of the global occupancy map of the $i^{th}$ pre-grouped subgroup, it indicates that compared with that the $i^{th}$ pre-grouped subgroup is used as a subgroup, when the $(i+1)^{th}$ pre-grouped subgroup is used as a subgroup, point cloud encoding efficiency decreases greatly when packing is performed by using the global matching packing algorithm. In this case, it is determined that the $i^{th}$ pre-grouped subgroup is one of the plurality of subgroups.

It may be understood that, if a global matched patch in the $i^{th}$ pre-grouped subgroup is still a global matched patch in the $(i+1)^{th}$ subgroup, the size of the global occupancy map of the $(i+1)^{th}$ pre-grouped subgroup is greater than or equal to the size of the global occupancy map of the $i^{th}$ pre-grouped subgroup. However, there may be a case in which a group of global matched patches in the $i^{th}$ pre-grouped subgroup are not global matched patches in the $(i+1)^{th}$ pre-grouped subgroup. In this case, it may cause the size of the global occupancy map of the $(i+1)^{th}$ pre-grouped subgroup to be less than the size of the global occupancy map of the $i^{th}$ pre-grouped subgroup. In consideration of this reason, this manner is proposed.

Manner B: The feature information of the $i^{th}$ pre-grouped subgroup includes an area of a union patch occupancy map of the $i^{th}$ pre-grouped subgroup. Correspondingly, when a total area of a union patch occupancy map of the $(i+1)^{th}$ pre-grouped subgroup is decreased by greater than or equal to a fourth threshold compared with a total area of the union patch occupancy map of the $i^{th}$ pre-grouped subgroup, it indicates that compared with that the $i^{th}$ pre-grouped subgroup is used as a subgroup, when the $(i+1)^{th}$ pre-grouped subgroup is used as a subgroup, point cloud encoding efficiency decreases greatly when packing is performed by using the global matching packing algorithm. In this case, it is determined that the $i^{th}$ pre-grouped subgroup is a subgroup. For related descriptions of the manner, refer to related descriptions of the manner A. Details are not described herein again.

The foregoing mainly describes, from a method perspective, the solutions provided in the embodiments of this application. To implement the foregoing functions, corresponding hardware structures and/or software modules for performing the functions are included. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the encoder may be grouped into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in the embodiments of this application, module division is an example and is merely a logical function division. There may be another division manner in an actual implementation.

Figure 15:
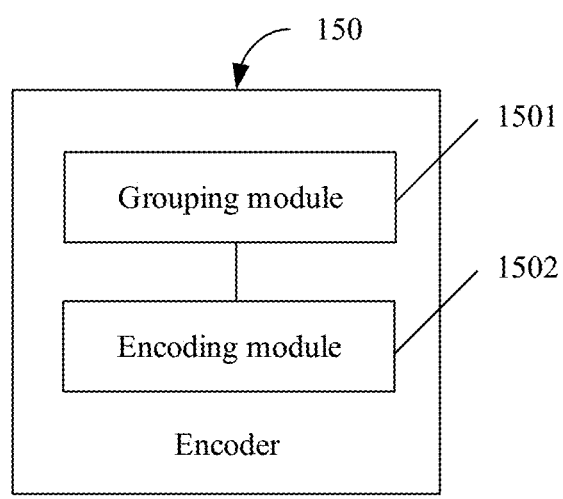
FIG. 15 is a schematic block diagram of an encoder according to an embodiment of this application.

FIG. 15 is a schematic block diagram of an encoder 150 according to an embodiment of this application. The encoder 150 includes a grouping module 1501 and an encoding module 1502.

In an example, the grouping module 1501 may correspond to the packing module 102 in FIG. 2. For example, a packing process may include a process of grouping a to-be-coded point cloud group. For example, in the process of grouping the to-be-coded point cloud group, an occupancy map of a point cloud included in a plurality of subgroups is generated. Correspondingly, the encoding module 1502 may correspond to a combination of one or more modules in FIG. 2. For example, the encoding module 1502 may correspond to modules (for example, the depth map generation module 103, the texture map generation module 104, and the second filling module 111) in FIG. 2 that receive the occupancy map of the point cloud and a module that is connected to or communicates with the modules.

In another example, the grouping module 1501 may correspond to the grouping submodule in the packing module 102 in FIG. 2. For example, a grouping process and a packing process are relatively independent of each other. Correspondingly, the encoding module 1502 may correspond to a combination of one or more modules in FIG. 2. For example, the encoding module 1502 may correspond to the packing submodule in the packing module 102 in FIG. 2, modules (for example, the depth map generation module 103, the texture map generation module 104, and the second filling module 111) that receive the occupancy map of the point cloud included in the subgroups, and a module that is connected to or communicate with the modules.

For a specific encoding function, refer to the conventional technology or the foregoing explanation of the principle of the encoder shown in FIG. 2. Details are not described herein again.

In a feasible implementation, the grouping module 1501 is configured to group a to-be-coded point cloud group into a plurality of subgroups, where grouping the to-be-coded point cloud group into the plurality of subgroups includes pre-grouping a plurality of frames of point clouds in the to-be-coded point cloud group to obtain a pre-grouped subgroup, and determining, based on feature information of the pre-grouped subgroup, that the pre-grouped subgroup is one of the plurality of subgroups, where the feature information is used to represent a size of an occupancy map of a point cloud in the pre-grouped subgroup. The encoding module 1502 is configured to encode a point cloud included in the plurality of subgroups. For example, with reference to FIG. 5, the grouping module 1501 may be configured to perform S101, and the encoding module 1502 may be configured to perform S102.

In a feasible implementation, in an aspect of pre-grouping the plurality of frames of point clouds in the to-be-coded point cloud group to obtain the pre-grouped subgroup, the grouping module 1501 is further configured to pre-group, for an $i^{th}$ time by using a $i^{th}$ frame of point cloud as a start point, point clouds that are not grouped in the to-be-coded point cloud group, to obtain an $i^{th}$ pre-grouped subgroup, where the $j^{th}$ frame of point cloud is a first frame of point cloud in the point clouds that are not grouped, $i \geq 1$, and i is an integer, $j \geq 1$, and j is an integer, and the $i^{th}$ pre-grouped subgroup includes one or more frames of point clouds starting from the $j^{th}$ frame of point cloud. Correspondingly, in an aspect of determining, based on the feature information of the pre-grouped subgroup, that the pre-grouped subgroup is one of the plurality of subgroups, the grouping module 1501 is further configured to determine, based on feature information of the $i^{th}$ pre-grouped subgroup, that the $i^{th}$ pre-grouped subgroup is one of plurality of subgroups.

In a feasible implementation, in an aspect of determining, based on the feature information of the $i^{th}$ pre-grouped subgroup, that the $i^{th}$ pre-grouped subgroup is one of plurality of subgroups, the grouping module 1501 is further configured to determine, based on the feature information of the $i^{th}$ pre-grouped subgroup and feature information of an $(i+1)^{th}$ pre-grouped subgroup, that the $i^{th}$ pre-grouped subgroup is one of the plurality of subgroups.

In a feasible implementation, in an aspect of determining, based on the feature information of the $i^{th}$ pre-grouped subgroup and the feature information of the $(i+1)^{th}$ pre-grouped subgroup, that the $i^{th}$ pre-grouped subgroup is one of the plurality of subgroups, the grouping module 1501 is further configured to determine that the $i^{th}$ pre-grouped subgroup is one of the plurality of subgroups when the feature information of the $i^{th}$ pre-grouped subgroup meets a preset condition and the feature information of the $(i+1)^{th}$ pre-grouped subgroup does not meet the preset condition. For example, with reference to FIG. 7, the grouping module 1501 may be configured to perform S207. For another example, with reference to FIG. 13, the grouping module 1501 may be configured to perform some steps in S303 and S304.

In a feasible implementation, the first threshold is a predefined value. Alternatively, the first threshold is determined based on a maximum size that is obtained based on a candidate packing algorithm and that is of an occupancy map of the point cloud in the to-be-coded point cloud group.

In a feasible implementation, the feature information of the $i^{th}$ pre-grouped subgroup includes a size of an occupancy map of a point cloud in the $i^{th}$ pre-grouped subgroup. Correspondingly, in an aspect of determining that the $i^{th}$ pre-grouped subgroup is one of the plurality of subgroups when the feature information of the $i^{th}$ pre-grouped subgroup meets the preset condition and the feature information of the $(i+1)^{th}$ pre-grouped subgroup does not meet the preset condition, the grouping module 1501 is further configured to, when a quantity of frames of large-size point clouds in the $i^{th}$ pre-grouped subgroup is less than or equal to a first preset quantity, and a quantity of frames of large-size point clouds in the $(i+1)^{th}$ pre-grouped subgroup is greater than the first preset quantity, determine that the $i^{th}$ pre-grouped subgroup is one of the plurality of subgroups, where the large-size point cloud is a point cloud whose occupancy map size is greater than or equal to a second threshold, or when an average value of a ratio of a size that is obtained based on a global matching packing algorithm and that is of the occupancy map of the point cloud in the $i^{th}$ pre-grouped subgroup to a size that is obtained based on a candidate packing algorithm and that is of the occupancy map of the point cloud in the $i^{th}$ pre-grouped subgroup is less than or equal to a third threshold, and an average value of a ratio of a size that is obtained based on the global matching packing algorithm and that is of an occupancy map of a point cloud in the $(i+1)^{th}$ pre-grouped subgroup to a size that is obtained based on the candidate packing algorithm and that is of the occupancy map of the point cloud in the $(i+1)^{th}$ pre-grouped subgroup is greater than the third threshold, determine that the $i^{th}$ pre-grouped subgroup is one of the plurality of subgroups.

In a feasible implementation, the second threshold is a predefined value. Alternatively, the large-size point cloud is a point cloud whose occupancy map size obtained based on the global matching packing algorithm is greater than or equal to the second threshold, and the second threshold is determined based on a maximum size that is obtained based on the candidate packing algorithm and that is of an occupancy map of the point cloud in the to-be-coded point cloud group, or determined based on a size that is obtained based on the candidate packing algorithm and that is of an occupancy map of a current point cloud.

In a feasible implementation, the feature information of the $i^{th}$ pre-grouped subgroup includes a size of a global occupancy map of the $i^{th}$ pre-grouped subgroup. Correspondingly, in an aspect of determining, based on the feature information of the $i^{th}$ pre-grouped subgroup and the feature information of the $(i+1)^{th}$ pre-grouped subgroup, that the $i^{th}$ pre-grouped subgroup is one of the plurality of subgroups, the grouping module 1501 is further configured to, when the size of the global occupancy map of the $i^{th}$ pre-grouped subgroup is less than or equal to a first threshold, and a size of a global occupancy map of the $(i+1)^{th}$ pre-grouped subgroup is greater than the first threshold, determine that the $i^{th}$ pre-grouped subgroup is one of the plurality of subgroups, or when a size of a global occupancy map of the $(i+1)^{th}$ pre-grouped subgroup is decreased by greater than or equal to a fifth threshold compared with the size of the global occupancy map of the $i^{th}$ pre-grouped subgroup, determine that the $i^{th}$ pre-grouped subgroup is one of the plurality of subgroups.

In a feasible implementation, the feature information of the $i^{th}$ pre-grouped subgroup includes an area of a union patch occupancy map of the $i^{th}$ pre-grouped subgroup. In an aspect of determining, based on the feature information of the $i^{th}$ pre-grouped subgroup and the feature information of the $(i+1)^{th}$ pre-grouped subgroup, that the $i^{th}$ pre-grouped subgroup is one of the plurality of subgroups, the grouping module 1501 is further configured to, when a total area of a union patch occupancy map of the $(i+1)^{th}$ pre-grouped subgroup is decreased by greater than or equal to a fourth threshold compared with a total area of the union patch occupancy map of the $i^{th}$ pre-grouped subgroup, determine that the $i^{th}$ pre-grouped subgroup is one of the plurality of subgroups.

In a feasible implementation, in an aspect of pre-grouping, for the $i^{th}$ time by using the $j^{th}$ frame of point cloud as the start point, the point clouds that are not grouped in the to-be-coded point cloud group, to obtain the $i^{th}$ pre-grouped subgroup, the grouping module 1501 is further configured to slide, by using the $j^{th}$ frame of point cloud as a start point, a window for an $i^{th}$ time on the point clouds that are not grouped in the to-be-coded point cloud group, to obtain the $i^{th}$ pre-grouped subgroup, or perform, by using the $j^{th}$ frame of point cloud as a start point, a dichotomy for an $i^{th}$ time on the point clouds that are not grouped in the to-be-coded point cloud group, to obtain the $i^{th}$ pre-grouped subgroup.

In a feasible implementation, a step size used to slide the window for an $i_1^{th}$ time is greater than or equal to a step size used to slide the window for an $i_2^{th}$ time, where $1 \leq i_1 < i_2 \leq i$, and both $i_1$ and $i_2$ are integers.

In a feasible implementation, the grouping module 1501 is further configured to obtain, according to a formula $N[i+1]=N[i] \times c$, a step size $N[i+1]$ used to slide the window for an $(i+1)^{th}$ time, where $N[i]$ is a step size used to slide the window for the $i^{th}$ time, c is determined based on the quantity of frames of large-size point clouds in the $i^{th}$ pre-grouped subgroup, and the large-size point cloud is the point cloud whose occupancy map size is greater than or equal to the second threshold.

In a feasible implementation, c meets the following formula: $c=(a-b)/a$, where a is the first preset quantity, and b is the quantity of frames of large-size point clouds in the $i^{th}$ pre-grouped subgroup.

In a feasible implementation, in an aspect of pre-grouping, for the $i^{th}$ time by using the $j^{th}$ frame of point cloud as the start point, the point clouds that are not grouped in the to-be-coded point cloud group, to obtain the $i^{th}$ pre-grouped subgroup, the grouping module 1501 is further configured to slide, by using the $j^{th}$ frame of point cloud as a start point, a window for an $i^{th}$ time on the point clouds that are not grouped in the to-be-coded point cloud group, to obtain the $i^{th}$ pre-grouped subgroup. Correspondingly, in an aspect of determining, based on the feature information of the $i^{th}$ pre-grouped subgroup, that the $i^{th}$ pre-grouped subgroup is one of the plurality of subgroups, the grouping module 1501 is further configured to, when the feature information of the $i^{th}$ pre-grouped subgroup meets a preset condition, and feature information of an $(i+1)^{th}$ pre-grouped subgroup does not meet the preset condition, re-obtain the $(i+1)^{th}$ pre-grouped subgroup by using a second step size, where the second step size is less than a first step size, and the first step size is a step size used when the $(i+1)^{th}$ pre-grouped subgroup is obtained for a first time, and if feature information of a re-obtained $(i+1)^{th}$ pre-grouped subgroup does not meet the preset condition, re-obtain the $(i+1)^{th}$ pre-grouped subgroup by using a third step size, where the third step size is less than the second step size, and by analogy, when a quantity of times of re-obtaining the $(i+1)^{th}$ pre-grouped subgroup reaches a preset quantity of times, or a step size of a latest re-obtained $(i+1)^{th}$ pre-grouped subgroup is less than or equal to a preset step size, if feature information of the latest re-obtained $(i+1)^{th}$ pre-grouped subgroup does not meet the preset condition, determine that the $i^{th}$ pre-grouped subgroup is one of the plurality of subgroups. For example, with reference to FIG. 9A and FIG. 9B, the grouping module 1501 may be configured to perform S207A and S207B.

In a feasible implementation, in an aspect of grouping the to-be-coded point cloud group into the plurality of subgroups, the grouping module 1501 is further configured to, when a difference between a quantity of frames of point clouds included in the re-obtained $(i+1)^{th}$ pre-grouped subgroup and a quantity of frames of point clouds included in the $(i+1)^{th}$ pre-grouped subgroup obtained for the first time is less than or equal to a second preset quantity, determine that the $(i+1)^{th}$ pre-grouped subgroup re-obtained this time is a subgroup, or when a difference between a quantity of frames of point clouds included in the re-obtained $(i+1)^{th}$ pre-grouped subgroup and a quantity of frames of point clouds included in the $(i+1)^{th}$ pre-grouped subgroup obtained for the first time is greater than a second preset quantity, obtaining an $(i+2)^{th}$ pre-grouped subgroup by using a fourth step size, where a sum of the second step size and the fourth step size is less than the first step size, if feature information of the $(i+2)^{th}$ pre-grouped subgroup meets the preset condition, obtaining an $(i+3)^{th}$ pre-grouped subgroup by using a fifth step size, where a sum of the second step size, the fourth step size, and the fifth step size is less than the first step size, and by analogy, when a difference between a quantity of frames of point clouds included in an obtained $(i+k)^{th}$ pre-grouped subgroup and the quantity of frames of point clouds included in the $(i+1)^{th}$ pre-grouped subgroup obtained for the first time is less than or equal to the second preset quantity, if feature information of the $(i+k)^{th}$ pre-grouped subgroup meets the preset condition, determining that the $(i+k)^{th}$ pre-grouped subgroup is one of the plurality of subgroups, where k≥2, and k is an integer. For example, with reference to FIG. 9A and FIG. 9B, the grouping module 1501 may be configured to perform S207C.

In a feasible implementation, in an aspect of pre-grouping, for the $i^{th}$ time by using the $j^{th}$ frame of point cloud as the start point, the point clouds that are not grouped in the to-be-coded point cloud group, to obtain the $i^{th}$ pre-grouped subgroup, the grouping module 1501 is further configured to perform, by using the $j^{th}$ frame of point cloud as a start point, a dichotomy for an $i^{th}$ time on the point clouds that are not grouped in the to-be-coded point cloud group, to obtain the $i^{th}$ pre-grouped subgroup. Correspondingly, in an aspect of determining, based on the feature information of the $i^{th}$ pre-grouped subgroup, that the $i^{th}$ pre-grouped subgroup is one of the plurality of subgroups, the grouping module 1501 is further configured to, if the feature information of the $i^{th}$ pre-grouped subgroup meets a preset condition, determine that the $i^{th}$ pre-grouped subgroup is one of the plurality of subgroups. For example, with reference to FIG. 14, the grouping module 1501 may be configured to perform some steps in S403 and S404.

In a feasible implementation, the feature information of the $i^{th}$ pre-grouped subgroup includes a size of a global occupancy map of the $i^{th}$ pre-grouped subgroup. Correspondingly, that the feature information of the $i^{th}$ pre-grouped subgroup meets a preset condition includes that the size of the global occupancy map of the $i^{th}$ pre-grouped subgroup is less than or equal to a first threshold, and/or, a size of a global occupancy map of the $(i+1)^{th}$ pre-grouped subgroup is decreased by greater than or equal to a fifth threshold compared with the size of the global occupancy map of the $i^{th}$ pre-grouped subgroup.

In a feasible implementation, the feature information of the $i^{th}$ pre-grouped subgroup includes a size of an occupancy map of a point cloud in the $i^{th}$ pre-grouped subgroup. Correspondingly, that the feature information of the $i^{th}$ pre-grouped subgroup meets a preset condition includes a quantity of frames of large-size point clouds in the $i^{th}$ pre-grouped subgroup is less than or equal to a first preset quantity, where the large-size point cloud is a point cloud whose occupancy map size is greater than or equal to a second threshold, or an average value of a ratio of a size that is obtained based on a global matching packing algorithm and that is of the occupancy map of the point cloud in the $i^{th}$ pre-grouped subgroup to a size that is obtained based on a candidate packing algorithm and that is of the occupancy map of the point cloud in the $i^{th}$ pre-grouped subgroup is less than or equal to a third threshold. For an implementation of the second threshold, refer to the foregoing description.

In a feasible implementation, the feature information of the $i^{th}$ pre-grouped subgroup includes an area of a union patch occupancy map of the $i^{th}$ pre-grouped subgroup. Correspondingly, that the feature information of the $i^{th}$ pre-grouped subgroup meets a preset condition includes a total area of a union patch occupancy map of the $(i+1)^{th}$ pre-grouped subgroup is decreased by greater than or equal to a fourth threshold compared with a total area of the union patch occupancy map of the $i^{th}$ pre-grouped subgroup.

It may be understood that, when no conflict occurs, some or all feature information in any plurality of feasible implementations described above may be used in combination, to constitute a new technical solution. For example, for a method for determining whether the $i^{th}$ pre-grouped subgroup meets the preset condition, refer to the foregoing corresponding feasible implementation.

It may be understood that the modules in the encoder in this embodiment of this application are functional entities implementing various execution steps included in the corresponding point cloud encoding method in this application, that is, functional entities implementing all the steps in the corresponding point cloud encoding method in this application and extensions and variations of these steps. For brevity, details are not described in this specification again.

Figure 16:
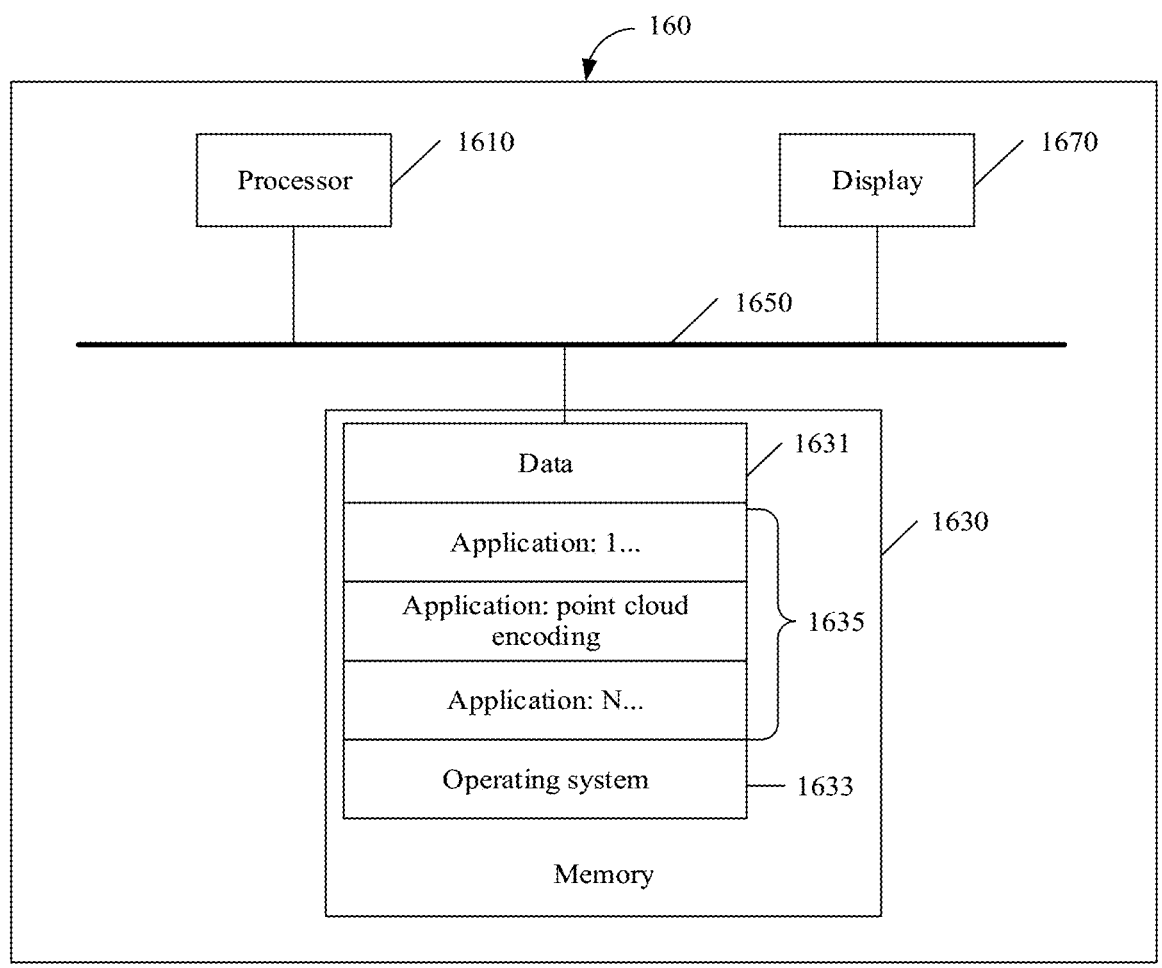
FIG. 16 is a schematic block diagram of an implementation of an encoding device according to an embodiment of this application.

FIG. 16 is a schematic block diagram of an implementation of an encoding device 160 according to an embodiment of this application. The encoding device 160 may include a processor 1610, a memory 1630, and a bus system 1650. The processor 1610 is connected to the memory 1630 through the bus system 1650. The memory 1630 is configured to store instructions. The processor 1610 is configured to execute the instructions stored in the memory 1630, to perform various point cloud encoding methods described in this application. To avoid repetition, details are not described herein again.

In this embodiment of this application, the processor 1610 may be a central processing unit (CPU), or the processor 1610 may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

The memory 1630 may include a ROM device or a RAM device. Any other proper type of storage device may alternatively be used as the memory 1630. The memory 1630 may include code and data 1631 that are accessed by the processor 1610 through the bus system 1650. The memory 1630 may further include an operating system 1633 and an application 1635. The application 1635 includes at least one program that enables the processor 1610 to perform point cloud encoding described in this application. For example, the application 1635 may include applications 1 to N, and further include a point cloud encoding application that performs the point cloud encoding method described in this application.

The bus system 1650 may further include a power bus, a control bus, a status signal bus, and the like, in addition to a data bus. However, for clear description, various types of buses in the figure are marked as the bus system 1650.

Optionally, the encoding device 160 may further include one or more output devices, for example, a display 1670. In an example, the display 1670 may be a touch sensitive display that combines a display and a touch sensitive unit that is operable to sense a touch input. The display 1670 may be connected to the processor 1610 through the bus system 1650.

A person skilled in the art can understand that the functions described with reference to various illustrative logical blocks, modules, and algorithm steps disclosed and described in this specification can be implemented by hardware, software, firmware, or any combination thereof. If the embodiments are implemented by software, the functions described with reference to the illustrative logical blocks, modules, and steps may be stored in or transmitted over a computer readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

In an example but not a limitation, such computer-readable storage media may include a RAM, a ROM, an EEPROM, a CD-ROM or another CD storage apparatus, a magnetic disk storage apparatus or another magnetic storage apparatus, a flash memory, or any other medium that can be used to store desired program code in a form of an instruction or a data structure and that is accessible by a computer. In addition, any connection is properly referred to as a computer-readable medium. For example, if instructions are transmitted from a web site, a server, or another remote source through a coaxial cable, an optical fiber, a twisted pair, a DSL, or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a CD, a laser disc, an optical disc, a DVD, and a BLU-RAY DISC. The disks usually reproduce data magnetically, whereas the discs reproduce data optically by using lasers. Combinations of the foregoing items should also be included in the scope of the computer-readable media.

Instructions may be executed by one or more processors such as one or more DSPs, general-purpose microprocessors, ASICs, FPGAs, or other equivalent integrated or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements. In an example, various descriptive logical blocks, units, and modules in the encoder 100 and the decoder 200 can be understood as corresponding circuit devices or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including the one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An apparatus comprising:
a memory configured to store instructions; and
a processor coupled to the memory, wherein the instructions cause the processor to be configured to:
group a to-be-coded point cloud group into a plurality of subgroups by:
pre-grouping a plurality of frames of first point clouds in the to-be-coded point cloud group to obtain a pre-grouped subgroup; and
determining, based on first feature information of the pre-grouped subgroup, that the pre-grouped subgroup is one of the subgroups, wherein the first feature information represents a first size of a first occupancy map of a first point cloud in the pre-grouped subgroup;
encode a second point cloud comprised in the subgroups;
pre-group, for an $i^{th}$ time and using a $j^{th}$ frame of point cloud as a start point, second point clouds that are not grouped in the to-be-coded point cloud group to obtain an $i^{th}$ pre-grouped subgroup, wherein the $j^{th}$ frame of the point cloud is a first frame of point cloud in the second point clouds, wherein i is an integer greater than or equal to 1, wherein j is an integer greater than or equal to 1, and wherein the $i^{th}$ pre-grouped subgroup comprises one or more frames of the second point clouds starting from the $j^{th}$ frame of the point cloud;
obtain second feature information of the $i^{th}$ pre-grouped subgroup; and
determine, based on the second feature information, that the $i^{th}$ pre-grouped subgroup is one of the subgroups.

2. The apparatus of claim 1, wherein the instructions further cause the processor to be configured to:
obtain third feature information of an $(i+1)^{th}$ pre-grouped subgroup; and
determine that the $i^{th}$ pre-grouped subgroup is one of the subgroups when the second feature information meets a preset condition and the third feature information does not meet the preset condition.

3. The apparatus of claim 2, wherein the second feature information comprises a second size of a first global occupancy map of the $i^{th}$ pre-grouped subgroup, and wherein the instructions further cause the processor to be configured to determine that the $i^{th}$ pre-grouped subgroup is one of the subgroups when the second size is less than or equal to a first threshold and when a third size of a second global occupancy map of the $(i+1)^{th}$ pre-grouped subgroup is greater than the first threshold.

4. The apparatus of claim 3, wherein the first threshold is a predefined value, or wherein the instructions further cause the processor to be configured to determine the first threshold based on a maximum size that is based on a candidate packing algorithm and that is of a second occupancy map of a third point cloud in the to-be-coded point cloud group.

5. The apparatus of claim 2, wherein the second feature information comprises a fourth size of a third occupancy map of a fourth point cloud in the $i^{th}$ pre-grouped subgroup, and wherein the instructions further cause the processor to be configured to:
    determine that the $i^{th}$ pre-grouped subgroup is one of the subgroups when a first quantity of frames of large-size point clouds in the $i^{th}$ pre-grouped subgroup is less than or equal to a first preset quantity and when a second quantity of frames of large-size point clouds in the $(i+1)^{th}$ pre-grouped subgroup is greater than the first preset quantity, wherein each of the large-size point clouds comprises a first occupancy map size that is greater than or equal to a second threshold; or
    determine that the $i^{th}$ pre-grouped subgroup is one of the subgroups when a first average value of a first ratio of a fifth size that is obtained based on a global matching packing algorithm and that is of the third occupancy map to a sixth size that is obtained based on a candidate packing algorithm and that is of the third occupancy map is less than or equal to a third threshold and when a second average value of a second ratio of a seventh size that is obtained based on the global matching packing algorithm and that is a fourth occupancy map of a fifth point cloud in the $(i+1)^{th}$ pre-grouped subgroup to an eighth size that is obtained based on the candidate packing algorithm and that is of the fourth occupancy map is greater than the third threshold.

6. The apparatus according to claim 5, wherein the second threshold is a predefined value or each of the large-size point clouds comprises a second occupancy map size that is based on the global matching packing algorithm and that is greater than or equal to the second threshold, and wherein the instructions further cause the processor to be configured to:
    determine the second threshold based on a maximum size that is based on the candidate packing algorithm and that is of a second occupancy map of a sixth point cloud in the to-be-coded point cloud group; or
    determine the second threshold based on a ninth size that is based on the candidate packing algorithm and that is of a fifth occupancy map of a current point cloud.

7. The apparatus of claim 1, wherein the instructions further cause the processor to be configured to:
    slide, using the $j^{th}$ frame of the point cloud as the start point, a window for the $i^{th}$ time on the second point clouds to obtain the $i^{th}$ pre-grouped subgroup; or
    perform, using the $j^{th}$ frame of the point cloud as the start point, a dichotomy for the $i^{th}$ time on the second point clouds to obtain the $i^{th}$ pre-grouped subgroup.

8. The apparatus of claim 7, wherein a first step size for sliding the window for an $i_1^{th}$ time is greater than or equal to a second step size for sliding the window for an $i_2^{th}$ time, wherein $1 \le i_1 < i_2 \le i$, and wherein both $i_1$ and $i_2$ are integers.

9. The apparatus of claim 8, wherein the instructions further cause the processor to be configured to obtain, using a first formula, a third step size for sliding the window for an $(i+1)^{th}$ time, and wherein the first formula is:

$$N[i+1]=N[i]\times c,$$

wherein $N[i+1]$ represents the third step size, wherein $N[i]$ represents a fourth step size for sliding the window for the $i^{th}$ time, wherein c is based on a quantity of frames of large-size point clouds in the $i^{th}$ pre-grouped subgroup, and wherein each of the large-size point clouds comprises an occupancy map size that is greater than or equal to a threshold.

10. The apparatus of claim 9, wherein the instructions further cause the processor to be configured to obtain c using a second formula, and wherein the second formula is:

$$c=(a-b)/a,$$

wherein a is a first preset quantity, and wherein b is the quantity of frames of the large-size point clouds.

11. The apparatus of claim 1, wherein the instructions further cause the processor to be configured to:
    slide, using the $j^{th}$ frame of the point cloud as the start point, a window for the $i^{th}$ time on the second point clouds to obtain the $i^{th}$ pre-grouped subgroup;
    obtain an $(i+1)^{th}$ pre-grouped subgroup using a first step size for a first time;
    re-obtain the $(i+1)^{th}$ pre-grouped subgroup using a second step size when the second feature information meets a preset condition and when third feature information of the $(i+1)^{th}$ pre-grouped subgroup does not meet the preset condition, wherein the second step size is less than the first step size;
    re-obtain the $(i+1)^{th}$ pre-grouped subgroup using a third step size when fourth feature information of a re-obtained $(i+1)^{th}$ pre-grouped subgroup does not meet the preset condition, wherein the third step size is less than the second step size; and
    determine that the $i^{th}$ pre-grouped subgroup is one of the subgroups when a quantity of times of re-obtaining the $(i+1)^{th}$ pre-grouped subgroup reaches a preset quantity of times or a latest step size of a latest re-obtained $(i+1)^{th}$ pre-grouped subgroup is less than or equal to a preset step size, and when latest feature information of the latest re-obtained $(i+1)^{th}$ pre-grouped subgroup does not meet the preset condition.

12. The apparatus of claim 11, wherein the instructions further cause the processor to be configured to:
    determine that the $(i+1)^{th}$ pre-grouped subgroup is one of the subgroups when a first difference between a third quantity of frames of point clouds comprised in the re-obtained $(i+1)^{th}$ pre-grouped subgroup and a fourth quantity of frames of point clouds comprised in the $(i+1)^{th}$ pre-grouped subgroup obtained for the first time is less than or equal to a second preset quantity;
    obtain an $(i+2)^{th}$ pre-grouped subgroup using a fourth step size when the first difference is greater than the second preset quantity, wherein a sum of the second step size and the fourth step size is less than the first step size;
    obtain an $(i+3)^{th}$ pre-grouped subgroup using a fifth step size when fifth feature information of the $(i+2)^{th}$ pre-grouped subgroup meets the preset condition, wherein a sum of the second step size, the fourth step size, and the fifth step size is less than the first step size; and
    determine that an $(i+k)^{th}$ pre-grouped subgroup is one of the subgroups when a second difference between a fifth quantity of frames of point clouds comprised in an obtained $(i+k)^{th}$ pre-grouped subgroup and the fourth quantity of frames of point clouds is less than or equal to the second preset quantity and when sixth feature information of the $(i+k)^{th}$ pre-grouped subgroup meets the preset condition, wherein k is an integer greater than or equal to 2.

13. The apparatus of claim 1, wherein the instructions further cause the processor to be configured to:
    perform, using the $j^{th}$ frame of the point cloud as the start point, a dichotomy for the $i^{th}$ time on the second point clouds to obtain the $i^{th}$ pre-grouped subgroup; and determine that the $i^{th}$ pre-grouped subgroup is one of the subgroups when the second feature information meets a preset condition.

14. A computer program product comprising computer-executable instructions stored on a non-transitory computer-readable medium that, when executed by a processor, cause an apparatus to:
grouping a to-be-coded point cloud group into a plurality of subgroups by:
pre-grouping a plurality of frames of first point clouds in the to-be-coded point cloud group to obtain a pre-grouped subgroup; and
determining, based on feature information of the pre-grouped subgroup, that the pre-grouped subgroup is one of the subgroups, wherein the first feature information represents a first size of a first occupancy map of a first point cloud in the pre-grouped subgroup;
encode a second point cloud comprised in the subgroups;
pre-group, for an $i^{th}$ time and using a $j^{th}$ frame of point cloud as a start point, second point clouds that are not grouped in the to-be-coded point cloud group to obtain an $i^{th}$ pre-grouped subgroup, wherein the $j^{th}$ frame of the point cloud is a first frame of point cloud in the second point clouds, wherein i is an integer greater than or equal to 1, wherein j is an integer greater than or equal to 1, and wherein the $i^{th}$ pre-grouped subgroup comprises one or more frames of the second point clouds starting from the $j^{th}$ frame of the point cloud;
obtain second feature information of the $i^{th}$ pre-grouped subgroup; and
determine, based on the second feature information, that the $i^{th}$ pre-grouped subgroup is one of the subgroups.

15. The computer program product of claim 14, wherein the computer-executable instructions further cause the apparatus to:
obtain third feature information of an $(i+1)^{th}$ pre-grouped subgroup; and
determine that the $i^{th}$ pre-grouped subgroup is one of the subgroups when the second feature information meets a preset condition and the third feature information does not meet the preset condition.

16. The computer program product of claim 15, wherein the second feature information comprises a second size of a first global occupancy map of the $i^{th}$ pre-grouped subgroup, and wherein the computer-executable instructions further cause the apparatus to determine that the $i^{th}$ pre-grouped subgroup is one of the subgroups when the second size is less than or equal to a first threshold and when a third size of a second global occupancy map of the $(i+1)^{th}$ pre-grouped subgroup is greater than the first threshold.

17. The computer program product of claim 16, wherein the first threshold is a predefined value, or wherein the computer-executable instructions further cause the apparatus to determine the first threshold based on a maximum size that is based on a candidate packing algorithm and that is of a second occupancy map of a third point cloud in the to-be-coded point cloud group.

18. A point cloud encoding method, comprising:
grouping a to-be-coded point cloud group into a plurality of subgroups by:
pre-grouping a plurality of frames of point clouds in the to-be-coded point cloud group to obtain a pre-grouped subgroup; and
determining, based on feature information of the pre-grouped subgroup, that the pre-grouped subgroup is one of the subgroups, wherein the first feature information represents a size of an occupancy map of a first point cloud in the pre-grouped subgroup;
encoding a second point cloud comprised in the subgroups;
pre-grouping, for an $i^{th}$ time and using a $j^{th}$ frame of point cloud as a start point, second point clouds that are not grouped in the to-be-coded point cloud group to obtain an $i^{th}$ pre-grouped subgroup, wherein the $j^{th}$ frame of the point cloud is a first frame of point cloud in the second point clouds, wherein i is an integer greater than or equal to 1, wherein j is an integer greater than or equal to 1, and wherein the $i^{th}$ pre-grouped subgroup comprises one or more frames of the second point clouds starting from the $j^{th}$ frame of the point cloud;
obtaining second feature information of the $i^{th}$ pre-grouped subgroup; and
determining, based on the second feature information, that the $i^{th}$ pre-grouped subgroup is one of the subgroups.

19. The point cloud encoding method of claim 18, further comprising:
obtaining third feature information of an $(i+1)^{th}$ pre-grouped subgroup; and
determining that the $i^{th}$ pre-grouped subgroup is one of the subgroups when the second feature information meets a preset condition and the third feature information does not meet the preset condition.

20. The point cloud encoding method of claim 19, wherein the second feature information comprises a second size of a first global occupancy map of the $i^{th}$ pre-grouped subgroup, and wherein the point cloud encoding method further comprising determining that the $i^{th}$ pre-grouped subgroup is one of the subgroups when the second size is less than or equal to a first threshold and when a third size of a second global occupancy map of the $(i+1)^{th}$ pre-grouped subgroup is greater than the first threshold.

* * * * *